(12) United States Patent
Ito

(10) Patent No.: US 8,351,771 B2
(45) Date of Patent: Jan. 8, 2013

(54) OPTICAL ELEMENT DRIVING DEVICE AND IMAGING DEVICE

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 12/834,896

(22) Filed: Jul. 13, 2010

(65) Prior Publication Data

US 2011/0044672 A1 Feb. 24, 2011

(30) Foreign Application Priority Data

Aug. 18, 2009 (JP) ................................. 2009-188869

(51) Int. Cl.
*G03B 17/00* (2006.01)
*G02B 27/64* (2006.01)

(52) U.S. Cl. .......................................... 396/55; 359/554

(58) Field of Classification Search .................... 396/55; 348/208.99, 208.4, 208.7, 208.11; 359/554–557
See application file for complete search history.

(56) References Cited

U.S. PATENT DOCUMENTS

| | | | |
|---|---|---|---|
| 7,684,685 B2 | 3/2010 | Takahashi | |
| 7,715,124 B2 * | 5/2010 | Ito | 359/814 |
| 7,822,330 B2 * | 10/2010 | Hasuda | 396/55 |
| 8,059,951 B2 * | 11/2011 | Miyamori et al. | 396/55 |
| 2007/0183766 A1 | 8/2007 | Miyamori et al. | |
| 2009/0129764 A1 | 5/2009 | Hayashi et al. | |

FOREIGN PATENT DOCUMENTS

| | | |
|---|---|---|
| JP | 2007-017957 | 1/2007 |
| JP | 2007-241254 | 9/2007 |
| WO | WO 2007055356 A1 * | 5/2007 |
| WO | WO2007/066499 | 6/2007 |
| WO | WO2008/155906 A1 * | 12/2008 |

* cited by examiner

*Primary Examiner* — W. B. Perkey
*Assistant Examiner* — Minh Phan
(74) *Attorney, Agent, or Firm* — Shinjyu Global IP

(57) ABSTRACT

An optical element driving device is provided with at least one optical element, a moving member, a fixed member, a first actuator, a first detection element, a second actuator, and a second detection element. The first actuator has a first coil and a first magnet. The first detection element is substantially aligned in a first direction relative to the first coil to detect the position of the moving member in the first direction. The second actuator has a second coil and a second magnet. The second detection element is substantially aligned in the first direction relative to the second coil to detect the position of the moving member in a second direction. The optical element, the first actuator, and the second actuator are substantially aligned in the first direction.

24 Claims, 17 Drawing Sheets

OPTICAL ELEMENT DRIVING DEVICE AND IMAGING DEVICE

CROSS-REFERENCE TO RELATED APPLICATIONS

This application claims priority under 35 U.S.C. §119 to Japanese Patent Application No. 2009-188869 filed on Aug. 18, 2009. The entire disclosure of Japanese Patent Application No. 2009-188869 is hereby incorporated herein by reference.

BACKGROUND

1. Technical Field

The technology disclosed herein relates to an optical element driving device and an imaging device.

2. Background Information

Imaging devices that are known today include digital still cameras and digital video cameras. Most of these types of imaging device are equipped with an image blur correction mechanism. An image blur correction mechanism reduces blurring of the image caused by moving the imaging device when an image is being captured. For example, an image blur correction mechanism has a drive device for driving a correcting lens of an imaging optical system. This drive device drives the correcting lens in a direction perpendicular to the optical axis so that blurring of the optical image caused by moving the imaging device is reduced. An image blur correction mechanism, in which an imaging element is driven rather than a correcting lens, is also known.

SUMMARY

One aspect of the technology disclosed herein is an optical element driving device that includes at least one optical element with an optical axis, a moving member that is capable of moving and supporting the optical element, a fixed member that supports the moving member and a first actuator with a first coil that is coupled to one of the moving member and the fixed member and a first magnet arranged opposite to the first coil. The first magnet is coupled to a different one of the moving member and the fixed member. The first magnet drives the moving member in a first direction perpendicular to the optical axis. The optical element driving device also includes a first detection element that is coupled to one of the moving member and the fixed member together with the first coil to detect the position of the moving member in the first direction relative to the fixed member. The optical element driving device further includes a second actuator with a second coil that is coupled to one of the moving member and the fixed member and a second magnet arranged opposite to the second coil. The second magnet is coupled to a different one of the moving member and the fixed member to drive the moving member in a second direction perpendicular to the first direction. The optical element, the first actuator and the second actuator are substantially aligned in the first direction. The second detection element is coupled to one of the moving member and the fixed member together with the second coil to detect the position of the moving member in the second direction relative to the fixed member. The first detection element is substantially aligned in the first direction with the first coil. The second detection element is substantially aligned in the first direction with the second coil when viewed from a third direction parallel to the optical axis.

BRIEF DESCRIPTION OF THE DRAWINGS

Referring now to the attached drawings which form a part of this original disclosure.

DETAILED DESCRIPTION OF EMBODIMENTS

Selected embodiments of the digital camera will now be explained with reference to the drawings. It will be apparent to those skilled in the art from this disclosure that the following descriptions of the embodiments of the digital camera are provided for illustration only and not for the purpose of limiting the invention as defined by the appended claims and their equivalents.

First Embodiment

1: Overview of Digital Camera

Figure 1:
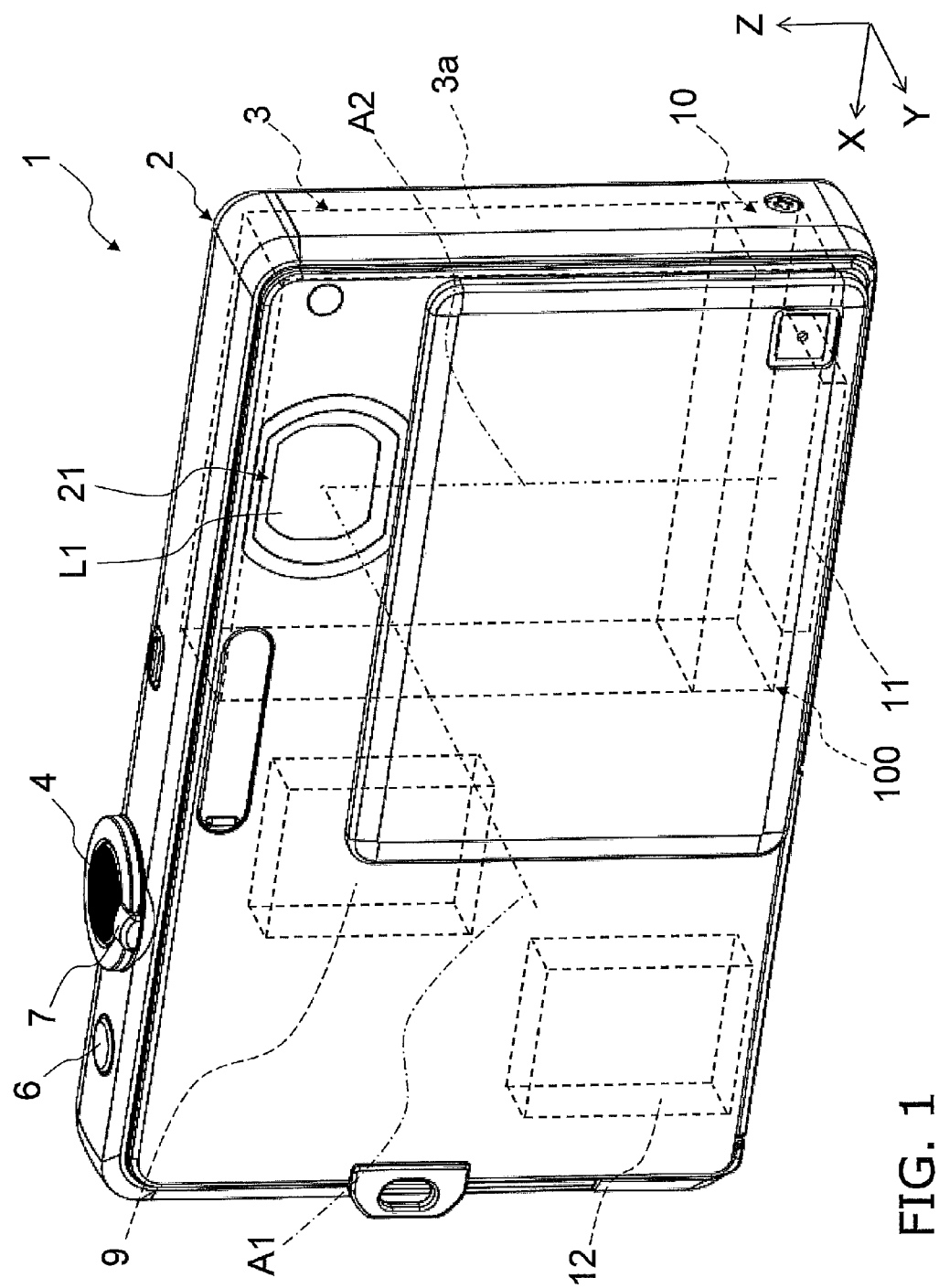
FIG. 1 is a simplified oblique view of a digital camera as seen from the front in accordance with a first embodiment.
Figure 2:
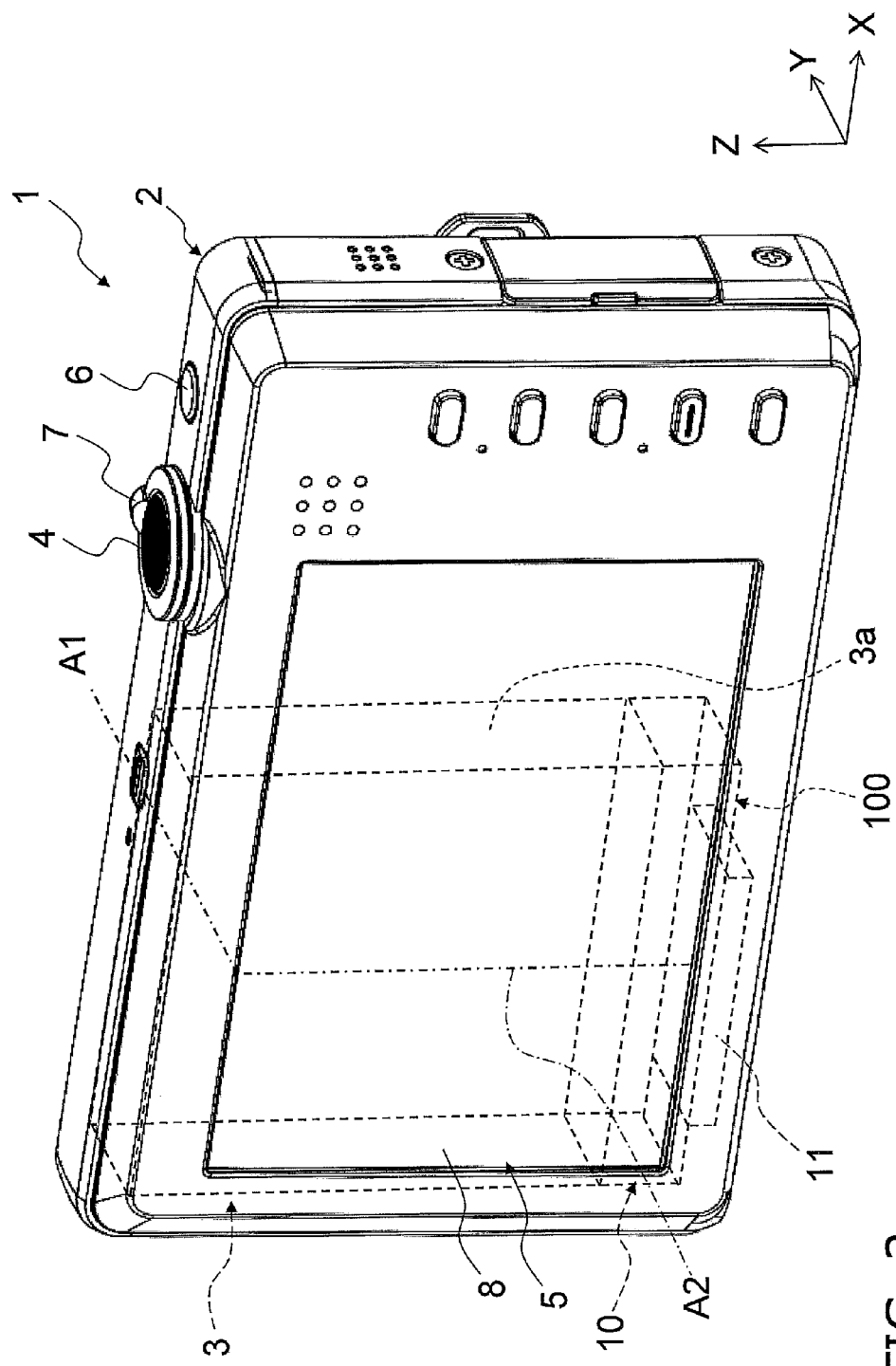
FIG. 2 is a simplified oblique view of a digital camera as seen from the rear in accordance with the first embodiment.

Referring initially to FIGS. 1 and 2, a digital camera 1 is illustrated in accordance with a first embodiment.

The digital camera 1 (an example of an imaging device) is a camera for acquiring an image of a subject and has a substantially rectangular camera body 2. A lens barrel 3 having a bending optical system is installed inside the camera body 2 in order to reduce the size and raise the zoom ratio.

The six sides of the digital camera 1 are defined as follows:

The side facing the subject when an image is being captured by the digital camera 1 is called the front face of a camera body 2, and the face on the opposite side is called the rear face. When an image is captured such that the vertical direction of the subject matches up with the short-side direction of the rectangular image being captured by the digital camera 1, i.e. the aspect ratio (the ratio of long to short sides) is generally 3:2, 4:3, 16:9, etc., the side facing upward in the vertical direction is called the top face, and the opposite side is called the bottom face. Further, when the an image is captured such that the vertical direction of the subject matches up with the short-side direction of the rectangular image being captured by the digital camera 1, the side that is on the left when viewed from the subject side is called the left face, and the opposite side is called the right face. The above definitions are not intended to limit the usage orientation of the digital camera 1.

Based on the above definitions, FIG. 1 is an oblique view illustrating the front face, top face, and right face.

These same definitions apply not only to the six sides of the digital camera 1 but also to the six sides of the various constituent members disposed in and on the digital camera 1. Specifically, the above definitions apply to the six sides of the various constituent members when they have been arranged in or on the digital camera 1.

As shown in FIG. 1, a three-dimensional perpendicular coordinate system is defined as having a Y-axis perpendicular to the front face of the camera body 2. Based on this definition, the direction facing the front face side from the rear face side is called the Y-axis direction positive side; the direction facing the left face side from the right face side is called the X-axis direction positive side; and the direction facing the top face side from the bottom face side and perpendicular to the X- and Y-axes is called the Z-axis direction positive side.

The drawings will be described below using this XYZ coordinate system as a reference. That is, the X-axis direction positive side, the Y-axis direction positive side, and the Z-axis direction positive side in the drawings each refer to the same respective direction in the various drawings.

2: Overall Configuration of Digital Camera

As shown in FIGS. 1 and 2, the digital camera 1 comprises a camera body 2 that houses various units as well as a lens barrel 3. The lens barrel 3 is provided with a shake compensation device 10 for reducing blurring of the optical image attributable to movement of the camera body 2. The lens barrel 3 is also provided with an imaging element 11 for converting an optical image into an image signal. Examples of the imaging element 11 include a CCD (charge coupled device) and a CMOS (complementary metal-oxide semiconductor) sensor.

As shown in FIGS. 1 and 2, a release button 4, a power switch 6 and a zoom adjusting lever 7 are provided on the top face of the camera body 2. The release button 4 is used by the user to input the exposure timing. The power switch 6 is used by the user to turn the digital camera 1 on or off. The zoom adjusting lever 7 is used by the user to adjust the zoom ratio and is capable of rotating within a specific angular range around the release button 4.

As shown in FIG. 2, a liquid crystal monitor 8 and a touch panel 5 are provided on the rear face of the camera body 2 for displaying the image acquired by the imaging element 11. The touch panel 5 is provided over the liquid crystal monitor 8. The user can look at the control screen displayed on the liquid crystal monitor 8 while using the touch panel 5 to change the various settings.

As shown in FIG. 1, a controller 9 and a memory element 12 such as a memory card are disposed inside the camera body 2 for performing various kinds of control of the digital camera 1. The controller 9 has a microcomputer. The memory element 12 is removably mounted to the camera body 2 and stores the images acquired by the imaging element 11.

3: Configuration of Lens Barrel

Figure 3:
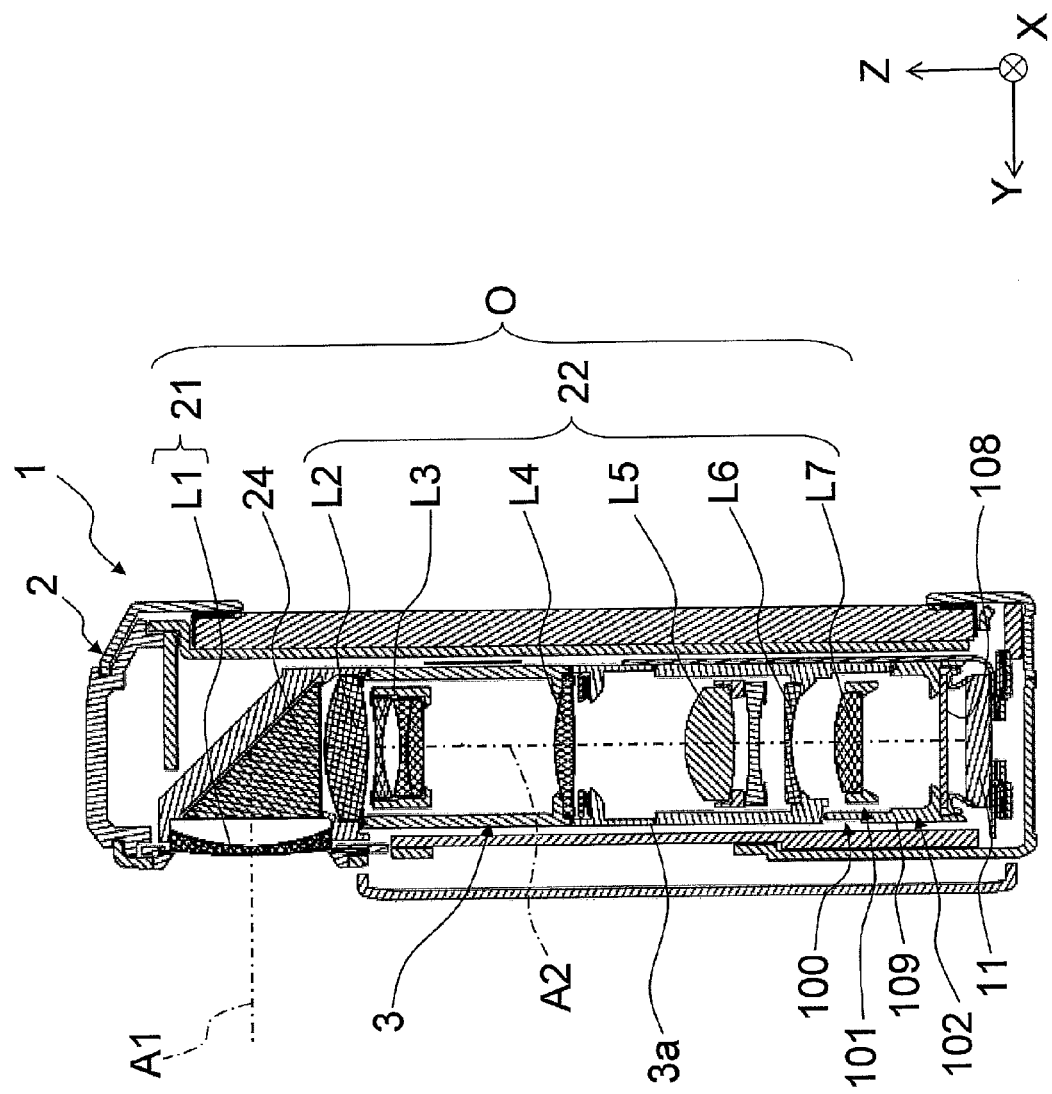
FIG. 3 is a schematic cross section of a lens barrel in according with the first embodiment.

FIG. 3 is a cross section of the lens barrel 3 in a plane that includes a first optical axis A1 and a second optical axis A2.

As shown in FIG. 3, the lens barrel 3 has an imaging optical system O for forming an optical image of a subject, a barrel body 3a for housing the imaging optical system O, and the shake compensation device 10 (see FIGS. 1 and 2).

The imaging optical system O has a first optical system 21 and a second optical system 22. The first optical system 21 has the first optical axis A1 and the second optical axis A2 and guides light from the subject into the camera body 2. A prism 24 is disposed along the first optical axis A1 and reflects the light guided by the first optical system 21 in a direction along the second optical axis A2 perpendicular to the first optical axis A1. The second optical system 22 has the second optical axis A2 and guides light emitted from the first optical system 21 along the second optical axis A2 to the imaging element 11. The imaging element 11, which converts the optical image of the subject formed by the imaging optical system O into an image signal, is provided on the emission side of the second optical system 22.

As shown in FIG. 3, the first optical system 21 has a first lens group L1 and the prism 24 (an example of a bending optical system). The first lens group L1 has the first optical axis A1 and is disposed along the first optical axis A1. The first lens group L1, for example, is a lens group having a negative refractive index and is an objective lens that receives light from the subject. The prism 24 reflects the light transmitted by the first lens group L1 toward the second optical system 22. In this embodiment, the reflection angle of the prism 24 is equal but not limited to 90 degrees. Instead of the prism 24, the bending optical system can also use a reflection member such as a minor.

As shown in FIG. 3, the second optical system 22 has a second lens group L2, a third lens group L3, a fourth lens group L4, a fifth lens group L5, a sixth lens group L6, and a correcting lens L7 (an example of an optical element). The second optical axis A2 is determined by the second to sixth lens groups L2 to L6.

The second lens group L2 is positioned near the prism 24 and receives light emitted from the prism 24. In this embodiment, the first lens group L1, the prism 24, and the second lens group L2 have an overall refractive index that is positive. The third lens group L3 is used for zoom adjustment. The third lens group L3 is disposed between the second lens group L2 and the imaging element 11. The third lens group L3 is movable in the Z-axis direction (an example of the third direction). When the third lens group L3 moves in the Z-axis direction, the focal length of the imaging optical system O changes. The fourth lens group L4 is fixed to the barrel body 3a. The fifth lens group L5 is used for focus adjustment. The fifth lens group L5 is movable in the Z-axis direction. When the fifth lens group L5 moves in the Z-axis direction, the focus (subject distance) changes. The sixth lens group L6 is fixed to the barrel body 3a. The correcting lens L7 is disposed between the sixth lens group L6 and the imaging element 11 and arranged to move in a direction perpendicular to the second optical axis A2. The correcting lens L7 has a third optical axis A3 (an example of an optical axis of an optical element) arranged parallel to the second optical axis A2, as shown in FIG. 3. Light passing through the sixth lens group L6 is guided to the imaging element 11 by the correcting lens L7.

The imaging optical system O is not limited to having the above configuration. For instance, the imaging optical system O can be such that the first lens group L1, the prism 24, and the second lens group L2 have an overall refractive index that is negative.

4: Configuration of Shake Compensation Device

As shown in FIGS. 1 and 2, the shake compensation device 10 comprises two shake detection sensors (not shown) and a lens drive device 100 (an example of an optical element driving device). The shake detection sensors detect the amounts of shake around the X- and Z-axes of the camera body 2. A gyro sensor is an example of a shake detection sensor. The shake detection sensors can also be some other type of sensor as long as those other types of sensors are capable of detecting movement of the camera body 2. An additional shake detection sensor can be installed for detecting shake around the Y-axis.

The lens drive device 100 drives the correcting lens L7 in two directions according to the detection results of the shake detection sensors. Referring now to FIGS. 4 to 7, the lens drive device 100 drives the correcting lens L7 in the X-axis direction (an example of the first direction; hereinafter also called the yaw direction) which is perpendicular to the second optical axis A2 and in the Y-axis direction (an example of the second direction; hereinafter also called the pitch direction). As discussed below, since a correcting lens frame 101 rotates around a rotating shaft 115 with respect to a base frame 102, the pitch direction is a direction along an arc whose center is the center axis M of the rotating shaft 115, but here the pitch direction is considered to be substantially the same as the Y-axis direction.

In this embodiment, the correcting lens L7 is an example of an optical element, but the optical element driven by the lens drive device 100 is not limited to being a single lens such as the correcting lens L7. For example, the optical element may include a plurality of lenses. Other examples of possible optical elements driven by the lens drive device 100 include an imaging element such as a CCD image sensor or a CMOS image sensor. If the optical element is an imaging element, then it is possible for the optical axis of the optical element to be a line that passes through the center of the light receiving face of the imaging element and is perpendicular to the light receiving face.

5: Configuration of Lens Drive Device

As shown in FIGS. 4 to 7, the lens drive device 100 includes the correcting lens L7, the correcting lens frame 101 that supports the correcting lens L7, the base frame 102 (an example of a fixed member), a guide mechanism 105, a pitch actuator 103 (an example of a second actuator), a yaw actuator 104 (an example of a first actuator), a pitch hall sensor 107 (an example of a second detection element), a yaw hall sensor 106 (an example of a first detection element), and the rotating shaft 115 that extends in the Z-axis direction.

The base frame 102 supports the correcting lens frame 101 so that it is movable in the pitch direction (Y-axis direction) and the yaw direction (X-axis direction). The pitch actuator 103 drives the correcting lens frame 101 in the pitch direction. The yaw actuator 104 drives the correcting lens frame 101 in the yaw direction. The guide mechanism 105 guides the correcting lens frame 101 in the pitch and yaw directions. The pitch hall sensor 107 detects the position of the correcting lens frame 101 in the pitch direction (Y-axis direction) relative to the base frame 102. The yaw hall sensor 106 detects the position of the correcting lens frame 101 in the yaw direction (X-axis direction) relative to the base frame 102.

Figure 4:
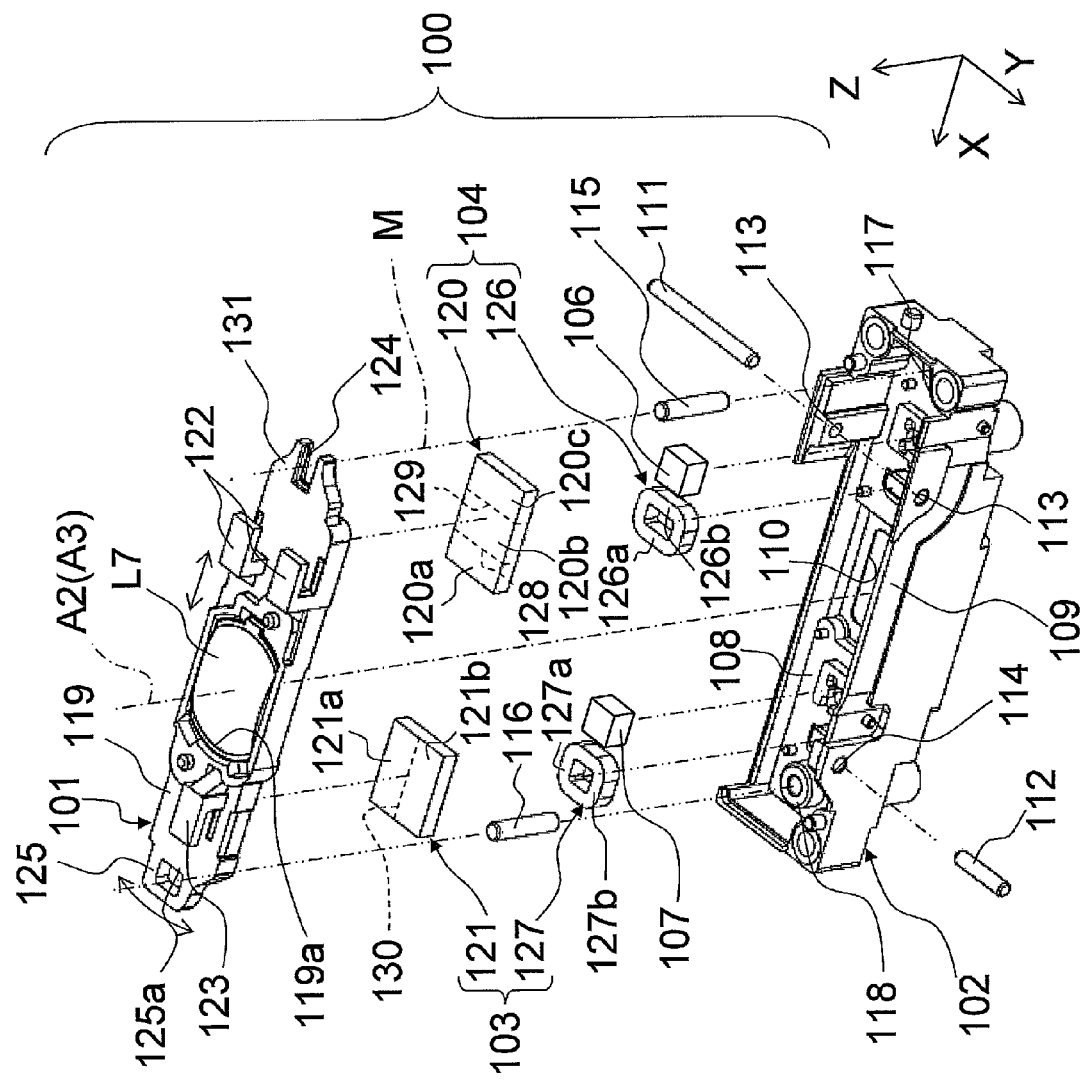
FIG. 4 is an exploded oblique view of a lens drive device in according with the first embodiment.

As shown in FIG. 3, the base frame 102 is fixed to the lower part of the barrel body 3a. As shown in FIG. 4, the base frame 102 has a substantially rectangular plate portion 108 and a wall portion 109 that extends in the Z-axis direction from the plate portion 108. A substantially rectangular opening 110 is formed in the plate portion 108. Light guided by the correcting lens L7 to the imaging element 11 passes through the opening 110. The opening 110 includes four corners with a substantially circular shape. The opening 110 is formed approximately in the center of the plate portion 108. The opening 110 can also have an elliptical or circular shape.

Figure 5:
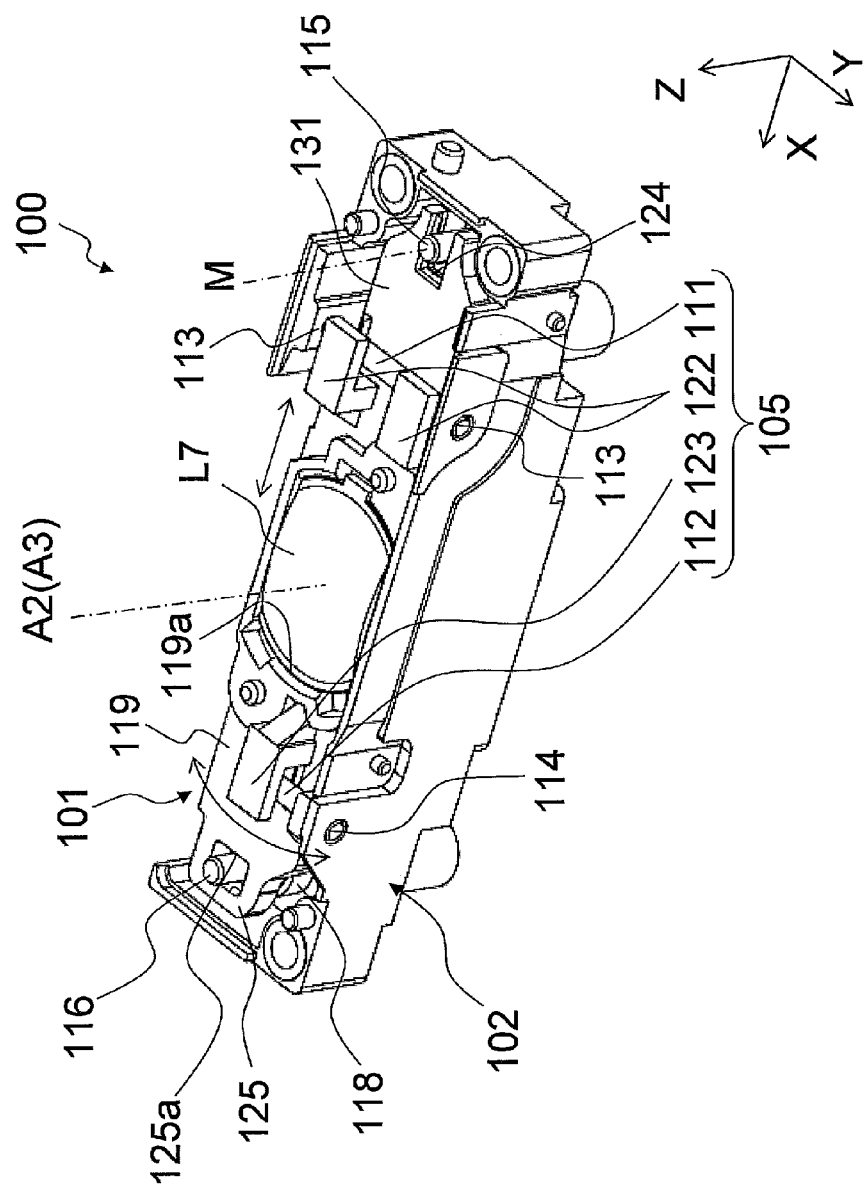
FIG. 5 is an oblique view of a lens drive device in according with the first embodiment.

As shown in FIGS. 4 and 5, a pair of first support portions 113 and a second support portion 114 are formed on the wall portion 109 for supporting a first guide shaft 111 and a second guide shaft 112, respectively. The pair of first support portions 113 is arranged on the X-axis direction negative side of the opening 110 and spaced apart in the Y-axis direction. The second support portion 114 is on the X-axis direction positive side of the opening 110.

Figure 7:
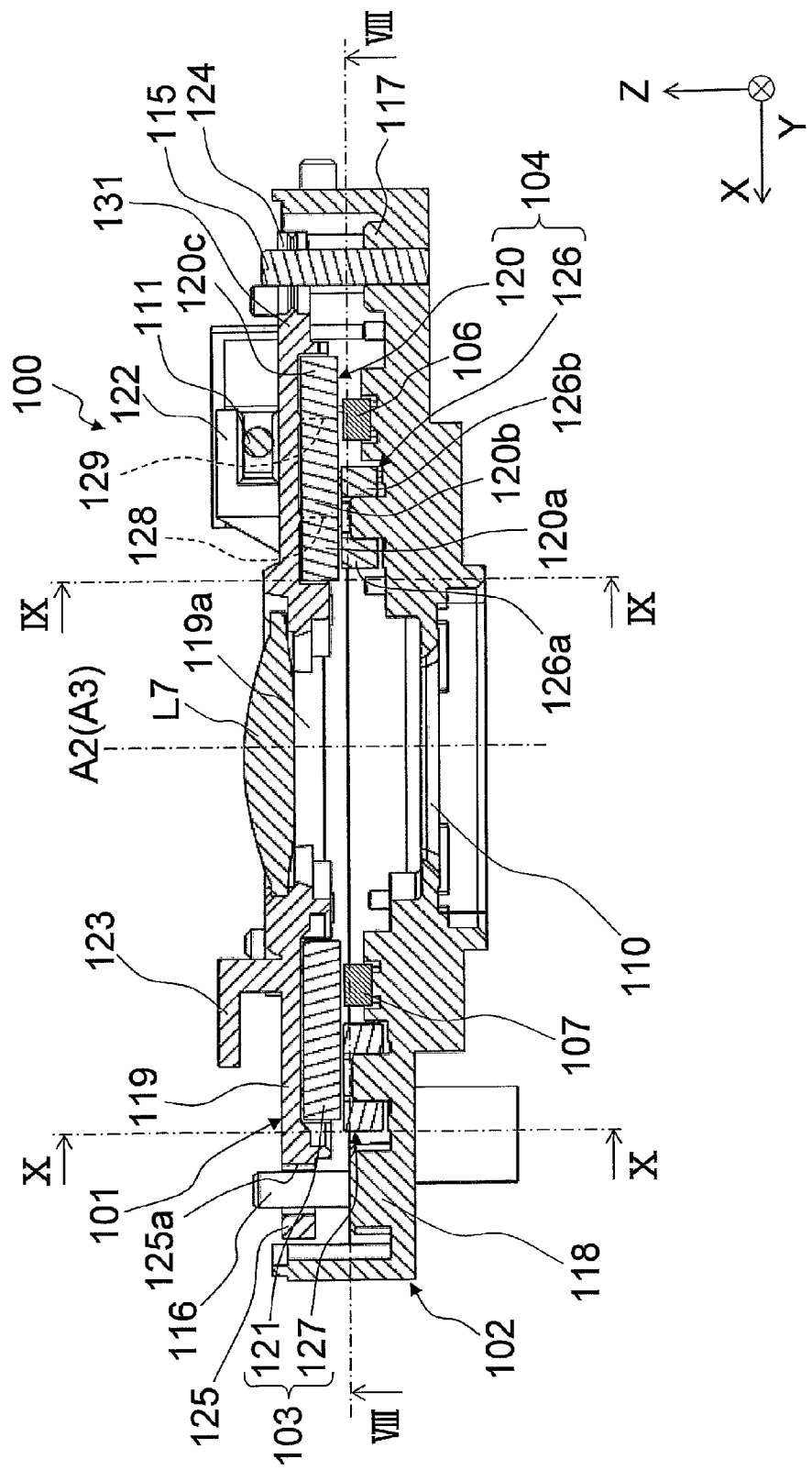
FIG. 7 is a cross section along the VII-VII line in FIG. 6 in according with the first embodiment.

As shown in FIGS. 4 and 7, a third support portion 117 and a fourth support portion 118 are formed on the plate portion 108 for supporting the rotating shaft 115 and a rotation restricting shaft 116, respectively. The third support portion 117 is formed on the X-axis direction negative side of the opening 110. The fourth support portion 118 is formed on the X-axis direction positive side of the opening 110. The rotating shaft 115 is fixed to the third support portion 117 by press fitting or the like. The rotation restricting shaft 116 is fixed to the fourth support portion 118 by press fitting.

As shown in FIGS. 4 to 7, the correcting lens frame 101 has a moving frame 119 (an example of a moving member), a guide portion 131 and a rotation restrictor 125.

Figure 6:
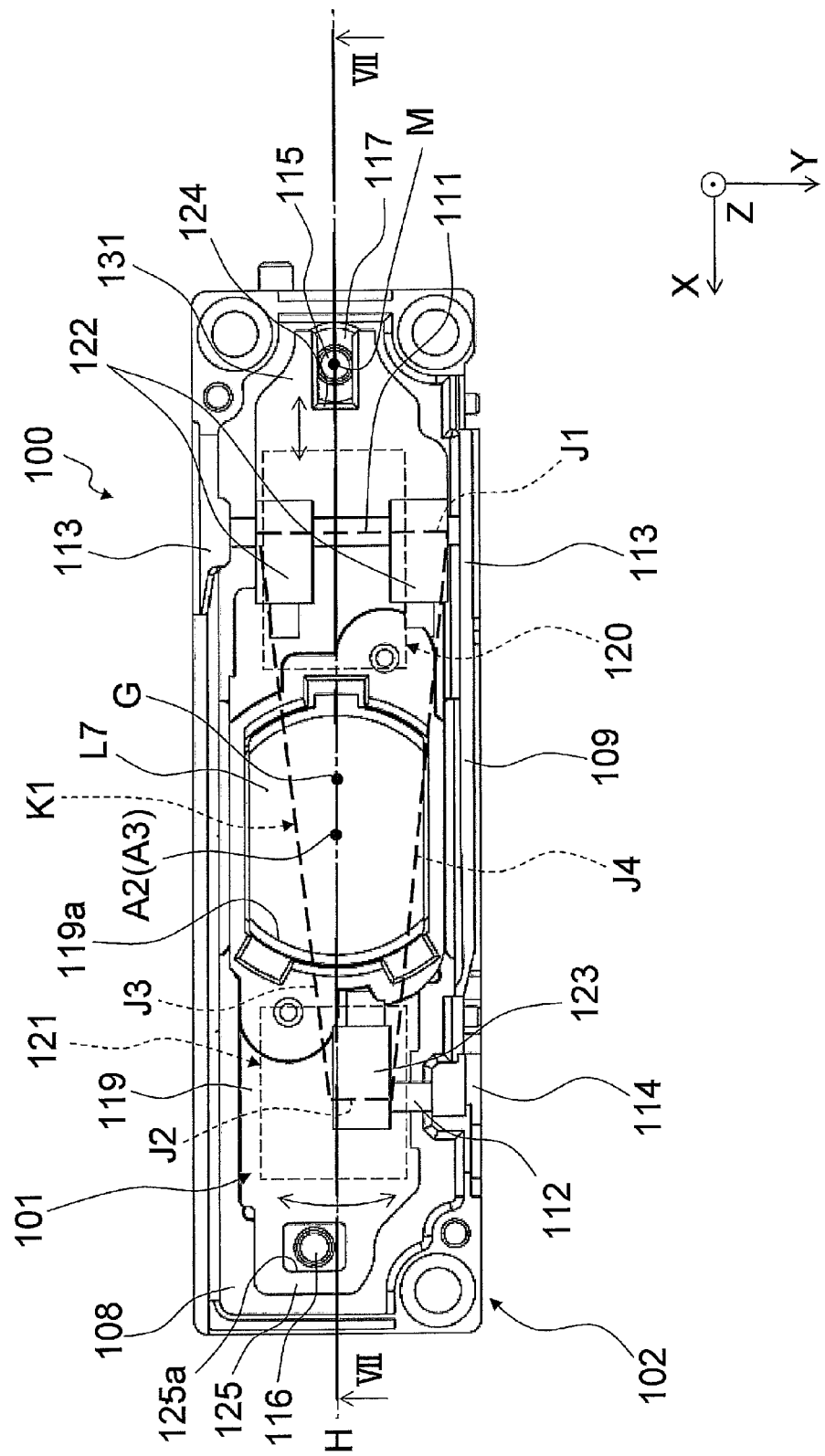
FIG. 6 is a top view of a lens drive device in according with the first embodiment.

The moving frame 119 supports the correcting lens L7 and is movably supported by the base frame 102 in directions perpendicular to the second optical axis A2 (the pitch and yaw directions). The moving frame 119 is substantially formed as a rectangular plate. Whenever the position of the moving frame 119 is such that the third optical axis A3 of the correcting lens L7 coincides with the second optical axis A2 of the second optical system 22, this position is hereinafter referred to as the reference position. In FIGS. 5 and 6, the moving frame 119 is shown in the reference position.

As shown in FIG. 6, the size of the moving frame 119 is smaller than that of the base frame 102. As shown in FIGS. 4 to 7, a rectangular opening 119a is formed in the center of the moving frame 119. The correcting lens L7 is fitted into the opening 119a. The opening 119a in the moving frame 119 is rectangular with circular corners.

As shown in FIGS. 4 to 7, the guide portion 131 guides the moving frame 119. The guide portion 131 is disposed at the end of the moving frame 119 on the X-axis direction negative side, i.e. on the right end of the moving frame 119 as illustrated in FIG. 4. A slender rotary guide groove 124 is formed in the guide portion 131 and extends in the X-axis direction. The rotating shaft 115 is inserted into the rotary guide groove 124.

As shown in FIGS. 4 to 7, the rotating shaft 115 is fixed to the third support portion 117 of the base frame 102 and arranged on the outside of the correcting lens L7, i.e. on the X-axis direction negative side of the correcting lens L7. The rotating shaft 115 is a cylindrical member that extends in the Z-axis direction and has a center axis M that is parallel to the Z-axis direction. As shown in FIG. 7, the end of the rotating shaft 115 is fixed to the third support portion 117.

The rotating shaft 115 can also be mounted on the moving frame 119. In addition, the guide portion 131 can be connected to a different member from the one in which the rotating shaft 115 is mounted. For instance, if the rotating shaft 115 is mounted on the moving frame 119, then the guide portion 131 can be connected to the base frame 102, and if the rotating shaft 115 is mounted on the base frame 102, then the guide portion 131 can be connected to the moving frame 119. Although the guide portion 131 has been disclosed above as being connected to either the base member 102 or the moving member 119, in an alternative embodiment the guide portion 131 can be integrally formed as a one-piece, unitary member with either the base frame 102 or the moving member 119.

As shown in FIGS. 4 to 7, since the rotating shaft 115 is inserted into the rotary guide groove 124, the correcting lens frame 101 is guided in the yaw direction by the rotating shaft 115 with respect to the base frame 102. The correcting lens frame 101 is able to rotate with respect to the base frame 102 around the center axis M of the rotating shaft 115. The above constitution allows the correcting lens L7 supported by the moving frame 119 to move in the pitch and yaw directions.

Furthermore, a constitution in which the correcting lens L7 rotates around the rotating shaft 115 is employed in this embodiment, but the constitution of the lens drive device 100 is not limited to this. The moving frame 119 can be movably disposed in a second direction perpendicular to the second optical axis A2 with respect to the base frame 102. For example, the moving frame 119 can be movably supported by a roller or another moving body can be disposed between the moving frame 119 and the base frame 102. If another moving body is provided, then it is possible that the moving frame 119 will be supported movably in the X-axis direction by this moving body, and this moving body will be supported movably in the Y-axis direction by the base frame 102.

The range of movement of the moving frame 119 is restricted by the rotation restrictor 125. More specifically, as shown in FIGS. 4 to 6, the rotation restrictor 125 is a substantially quadrangular portion, and is disposed at the end of the moving frame 119 on the X-axis direction positive side, i.e. the left end of the moving frame 119 in FIG. 4. As shown in FIGS. 4 to 7, a hole 125a is formed in the rotation restrictor 125. The rotation restricting shaft 116 is inserted into the hole 125a. The size of the hole 125a determines the movement range of the moving frame 119 in the yaw and pitch directions. As long as the movement in the pitch and yaw directions can be restricted, the shape of the rotation restrictor 125 may be something other than quadrangular.

The correcting lens frame 101 is movably supported by the base frame 102 via the guide mechanism 105. More specifically, as shown in FIG. 5, the guide mechanism 105 has a pair of first sliding portions 122, a second sliding portion 123, the first guide shaft 111 (an example of a first guide member), and the second guide shaft 112 (an example of a second guide member).

As shown in FIGS. 4, 5, and 7, the pair of first sliding portions 122 are substantially L-shaped portions that stick out from the moving frame 119 and are disposed on the X-axis direction negative side of the correcting lens L7. More specifically, a portion of the pair of first sliding portions 122 extends toward the Z-axis direction positive side and a portion of the pair of first sliding portions 122 extends toward the X-axis direction negative side. The first sliding portions 122 are mounted on the upper face of the moving frame 119, i.e. the face on the Z-axis direction positive side. As shown in FIG. 6, the pair of first sliding portions 122 are disposed so that they partially overlap a first magnet 120 when viewed in the Z-axis direction.

As shown in FIGS. 4, 5, and 7, the first guide shaft 111 is inserted between the first sliding portions 122 and the moving frame 119. The first guide shaft 111 is substantially parallel to the Y-axis direction. The ends of the first guide shaft 111 are fixed to the two first support portions 113. As shown in FIG. 6, the correcting lens frame 101 is supported by the pair of first sliding portions 122 and the first guide shaft 111 over the range indicated by the line J1 with respect to the base frame 102. The first sliding portions 122 can instead be formed by a single portion.

As shown in FIGS. 4, 5, and 7, the second sliding portion 123 is a substantially L-shaped portion that sticks out from the moving frame 119 and disposed on the X-axis direction positive side of the correcting lens L7. More specifically, a portion of the second sliding portion 123 extends toward the Z-axis direction positive side and a portion of the second sliding portion 123 extends towards the X-axis direction positive side. The second sliding portion 123 is mounted on the upper face of the moving frame 119, i.e. the face on the Z-axis direction positive side. As shown in FIG. 6, when viewed in the Z-axis direction, the second sliding portion 123 is located at a different position from that of a second magnet 121.

As shown in FIGS. 5 through 7, the second guide shaft 112 is inserted between the second sliding portion 123 and the moving frame 119. The second guide shaft 112 is substantially parallel to the Y-axis direction. One end of the second guide shaft 112 is fixed to the wall portion 109, i.e. the second support portion 114 of the base frame 102. As shown in FIG. 6, the dashed line J1 represents the point of contact between the first guide shaft 111 and the first sliding portions 122, and the dashed line J2 represents the point of contact between the second guide shaft 112 and the second sliding portion 123. Note that the line J1 is longer in the Y-axis direction than the line J2. As shown in FIGS. 5 and 6, the correcting lens frame 101 is supported along dashed lines J1 and J2.

The guide mechanism 105 supports the correcting lens frame 101 in the Z-axis direction but restricts the movement of the correcting lens frame 101 in the Z-axis direction with respect to the base frame 102. Furthermore, the guide mechanism 105 rotatably supports the correcting lens frame 101 in the pitch direction and movably supports the lens frame 101 in the yaw direction.

To drive the moving frame 119 stably and precisely, the center of gravity G of the entire moving portion is preferably disposed in a region formed by linking the sliding portions of the guide mechanism 105. For example, as shown in FIG. 6, in this embodiment the center of gravity G is disposed within a region K1 formed by linking the ends of the above-mentioned lines J1 and J2 with the lines J3 and J4. Since the center of gravity G is within the region K1, movement of the moving frame 119 in the yaw and pitch directions is stable. This constitution reduces rotation of the moving frame 119 around the X-axis with respect to the base frame 102.

The "moving portion" referred to here means the members made up of the correcting lens frame 101, the correcting lens L7, the first magnet 120, and the second magnet 121, and the center of gravity G of the entire moving portion refers to the center of gravity of this moving portion. As shown in FIG. 6, in this embodiment the first magnet 120 is larger than the second magnet 121, so the center of gravity G is offset from the third optical axis A3 of the correcting lens L7 toward the rotating shaft 115 when viewed in the Z-axis direction. However, the center of gravity G is located between the rotating shaft 115 and the third optical axis A3 of the correcting lens L7 along the X-axis direction and not offset in the Y-axis direction.

Figure 8:
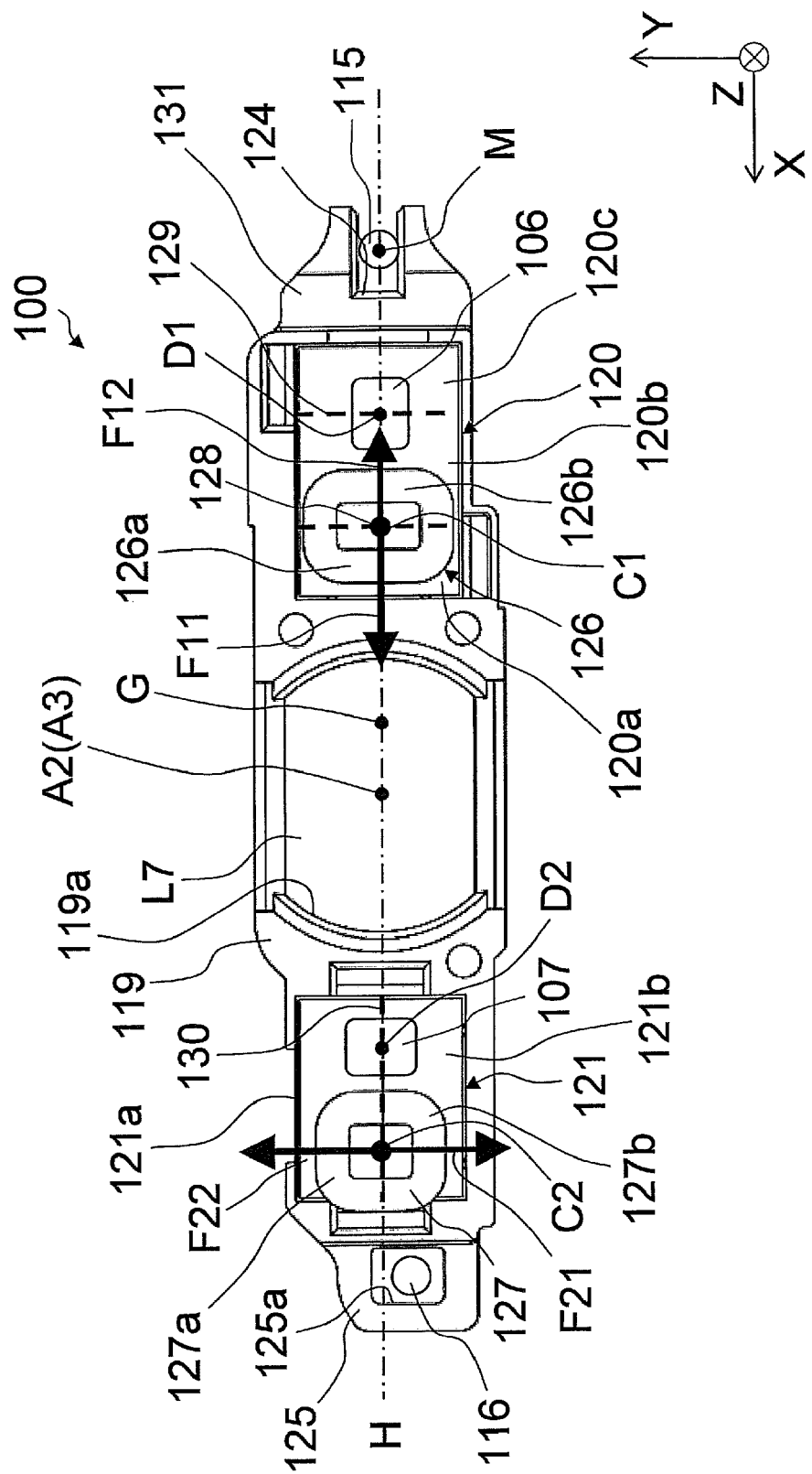
FIG. 8 is a schematic plan view of a lens drive device in according with the first embodiment.

As shown in FIGS. 4, 7, and 8, the yaw actuator 104 includes a first coil 126 and the first magnet 120 and is positioned on the X-axis direction negative side of the correcting lens L7. The yaw actuator 104 is disposed between the correcting lens frame 101 and the base frame 102 in the Z-axis direction. In this embodiment, the first coil 126 is mounted on the base frame 102, and the first magnet 120 is mounted on the correcting lens frame 101.

The first magnet 120 can be mounted on a different member from the one in which the first coil 126 is mounted. For example, if the first coil 126 is mounted on the correcting lens frame 101, then the first magnet 120 is mounted on the base frame 102, and if the first coil 126 is mounted on the base frame 102, then the first magnet 120 can be mounted on the correcting lens frame 101.

The first coil 126 comprises a conductive wire wound around an axis that is parallel to the second optical axis A2 and overall is in the form of an annular member. The first coil 126 is fixed to the upper face of the base frame 102, i.e. the face on the Z-axis direction positive side, and is disposed on the X-axis direction negative side of the correcting lens L7 when viewed in the Z-axis direction.

The first magnet 120 is fixed to the lower face of the correcting lens frame 101, i.e. the face on the Z-axis direction negative side, and is disposed on the X-axis direction negative side of the correcting lens L7 when viewed in the Z-axis direction. The first magnet 120 is disposed opposite to the first coil 126 and the yaw hall sensor 106 in the Z-axis direction.

As shown in FIGS. 4, 7, and 8, the first magnet 120 is magnetized with three poles: a first portion 120a, a second portion 120b, and a third portion 120c. For instance, the first portion 120a is magnetized with a N-pole (an example of a first magnetic pole), the second portion 120b is magnetized with a S-pole (an example of a second magnetic pole), and the third portion 120c is magnetized with a N-pole. The first magnet 120 also has a first polarization boundary line 128 and a second polarization boundary line 129 that separate the different magnetic poles. The first polarization line 128 is formed between the first portion 120a and the second portion 120b. The second polarization line 129 is formed between the second portion 120b and the third portion 120c. The first polarization line 128 and the second polarization line 129 are aligned substantially parallel to the Y-axis direction and substantially perpendicular to the X-axis direction. In other words, moving from the X-axis direction positive side towards the X-axis direction negative side, the three magnetized poles of the first magnet 120 and the polarization boundary lines are arranged as follows: the first portion 120a, the first polarization boundary line 128, the second portion 120b, the second polarization boundary line 129, and the third portion 120c. The second magnet 121, which will be discussed below, is smaller than first magnet 120. For instance, the length of the first magnet 120 in the X-axis direction is greater than the length of the second magnet 121 in the same direction.

As shown in FIG. 8, center C1 refers to the center of the first coil 126 and center C2 refers to the center of the second coil 127 when viewed in the Z-axis direction. When the moving frame 119 is located at the reference position, the center C1 of the first coil 126 is positioned over the first polarization line 128. In the alternative, the center C1 of the first coil 126 is also considered to be positioned substantially opposite to the first polarization line 128 in the Z-axis direction. When the moving frame 119 is located at the reference position, the center C2 of a second coil 127 is positioned on or over the second polarization line 129. The center C2 of the second coil 127 can also be considered positioned opposite the second polarization line 129.

As shown in FIGS. 4, 7, and 8, the pitch actuator 103 includes the second coil 127 and the second magnet 121 and is positioned on the X-axis direction positive side of the correcting lens L7. As shown in FIGS. 4 and 7, the pitch actuator 103 is positioned between the correcting lens frame 101 and the base frame 102. In this embodiment, the correcting lens L7 is positioned between the yaw actuator 104 and the pitch actuator 103 In the alternative, the correcting lens L7, the yaw actuator 104, and the pitch actuator 103 can be aligned in the X-axis direction but arranged differently. For example, the yaw actuator 104 can be placed on the same side of the correcting lens L7 as the pitch actuator 103.

Also, in this embodiment, the second coil 127 is fixed to the base frame 102, and the second magnet 121 is fixed to the correcting lens frame 101. However, the second coil 127 can be mounted to the correcting lens frame 101, and the second magnet 121 can be mounted to the base frame 102.

The second coil 127 includes a conductive wire wound around an axis that is parallel to the second optical axis A2 and forms an annular member. The second coil 127 is fixed to the upper face of the base frame 102, i.e. the face on the Z-axis direction positive side, and positioned on the X-axis direction positive side of the correcting lens L7.

The second magnet 121 is fixed to the lower face of the correcting lens frame 101, i.e. the face on the Z-axis direction negative side, and positioned on the X-axis direction negative side of the correcting lens L7. The second magnet 121 is positioned over or opposite both the second coil 127 and the pitch hall sensor 107, as shown in FIG. 7.

As shown in FIGS. 4, 7, and 8, the second magnet 121 is magnetized with two poles: a fourth portion 121a and a fifth portion 121b. For example, the fourth portion 121a is magnetized with a N-pole, and the fifth portion 121b is magnetized with a S-pole. Furthermore, the first magnet 120 has a third polarization boundary line 130 that separate the magnetic poles. In other words, the third polarization line 130 is formed between the fourth portion 121a and the fifth portion 121b. The third polarization line 130 is positioned parallel to the pitch direction. When moving from the Y-axis direction positive side towards the Y-axis direction negative side, the two magnetized poles of the second magnet 121 and the third polarization boundary line are arranged as follows: the fourth portion 121a, the third polarization line 130, and the fifth portion 121b.

As shown in FIG. 8, when the moving frame 119 is positioned at the reference position, the center C2 of the second coil 127 and the center D2 of the pitch hall sensor 107 are located on or over the third polarization line 130. In the alternative, the center C2 of the second coil 127 and the center D2 of the pitch hall sensor 107 can also be considered positioned opposite to the third polarization line 130.

With respect to the second optical axis A2, the yaw hall sensor 106 detects the position of the correcting lens frame 101 in the yaw direction (or X-axis direction). Here, the yaw hall sensor 106 is given as an example of a first detection element, but the first detection element can be, for example, a MR sensor or some other functionally equivalent sensor.

As shown in FIGS. 4 and 7, the yaw hall sensor 106 is mounted on the base frame 102 and positioned opposite to the first magnet 120 in the Z-axis direction. As shown in FIG. 8, the yaw hall sensor 106 is aligned with the first coil 126 in the X-axis direction. The first magnet 120 is positioned above or opposite to both the first coil 126 and the yaw hall sensor 106. As shown in FIG. 8, when the moving frame 119 is positioned at the reference position, the center D1 of the yaw hall sensor 106 is positioned on or over the second polarization line 129.

The yaw hall sensor 106 can be mounted on one of the moving frame 119 and the base frame 102, i.e. whichever one the first coil 126 is also mounted on.

Figure 9:
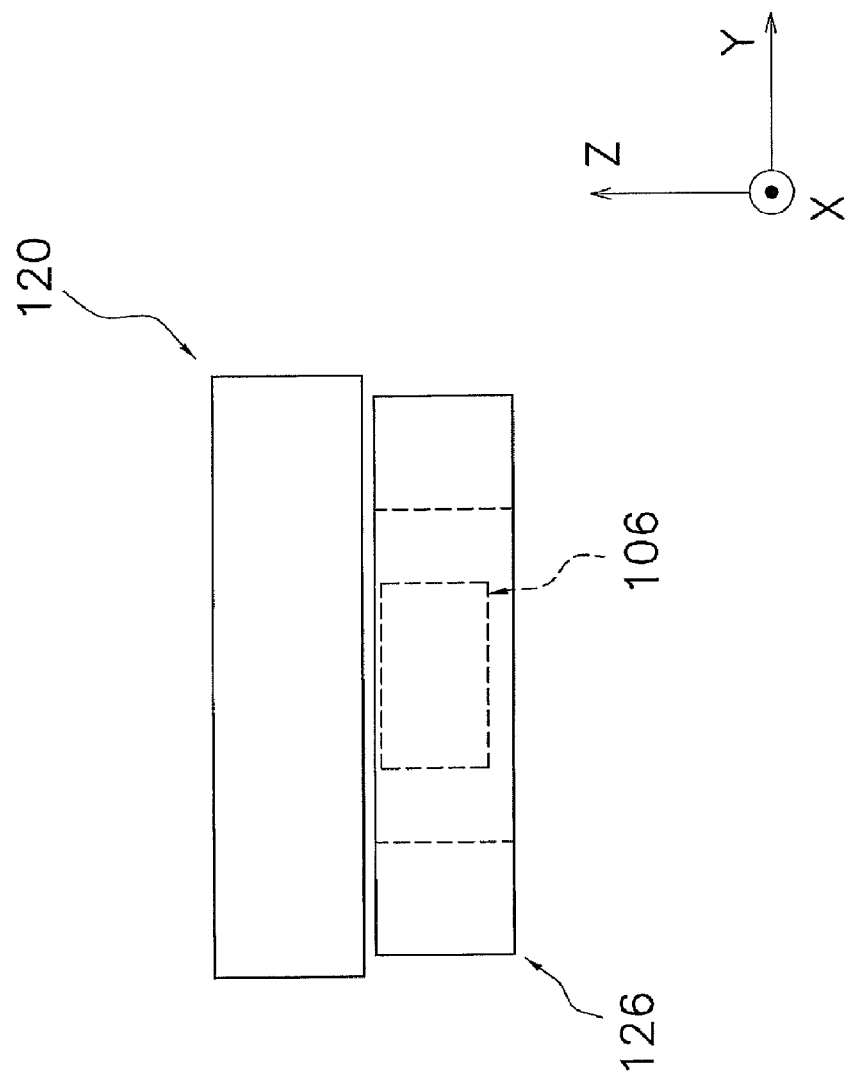
FIG. 9 is a simplified cross section along the IX-IX line in FIG. 7 in according with the first embodiment.

As shown in FIG. 7, the yaw hall sensor 106 is substantially arranged in the same position as the first coil 126 along the Z-axis direction. As shown in FIGS. 7 and 9, with respect to the second optical axis A2, the yaw hall sensor 106 is positioned on the outer side of the first coil 126, along the longitudinal direction of the correcting lens 101.

The positional relation between the yaw hall sensor 106 and the first coil 126 when viewed in the X-axis direction is not limited to that shown in FIG. 9. For example, when viewed in the X-axis direction, at least part of the yaw hall sensor 106 can extend beyond the first coil 126.

With respect to the second optical axis A2, the pitch hall sensor 107 detects the position of the correcting lens frame 101 in the pitch direction (or Y-axis direction). Here, the pitch hall sensor 107 is given as an example of a second detection element, but the second detection element can be, for example, a MR sensor or some other functionally equivalent sensor.

As shown in FIGS. 4 and 7, the pitch hall sensor 107 is mounted on the base frame 102 and positioned below or opposite to the second magnet 121. As shown in FIG. 8, the pitch hall sensor 107 is aligned with the second coil 127 in the X-axis direction. The second magnet 121 is positioned above or opposite to both the second coil 127 and the pitch hall sensor 107. When the moving frame 119 is located at the reference position, the center D2 of the pitch hall sensor 107 is positioned on or over the third polarization line 130.

The pitch hall sensor 107 can be mounted on one of the moving frame 119 and the base frame 102, i.e. whichever one the second coil 126 is also mounted to.

Figure 10:
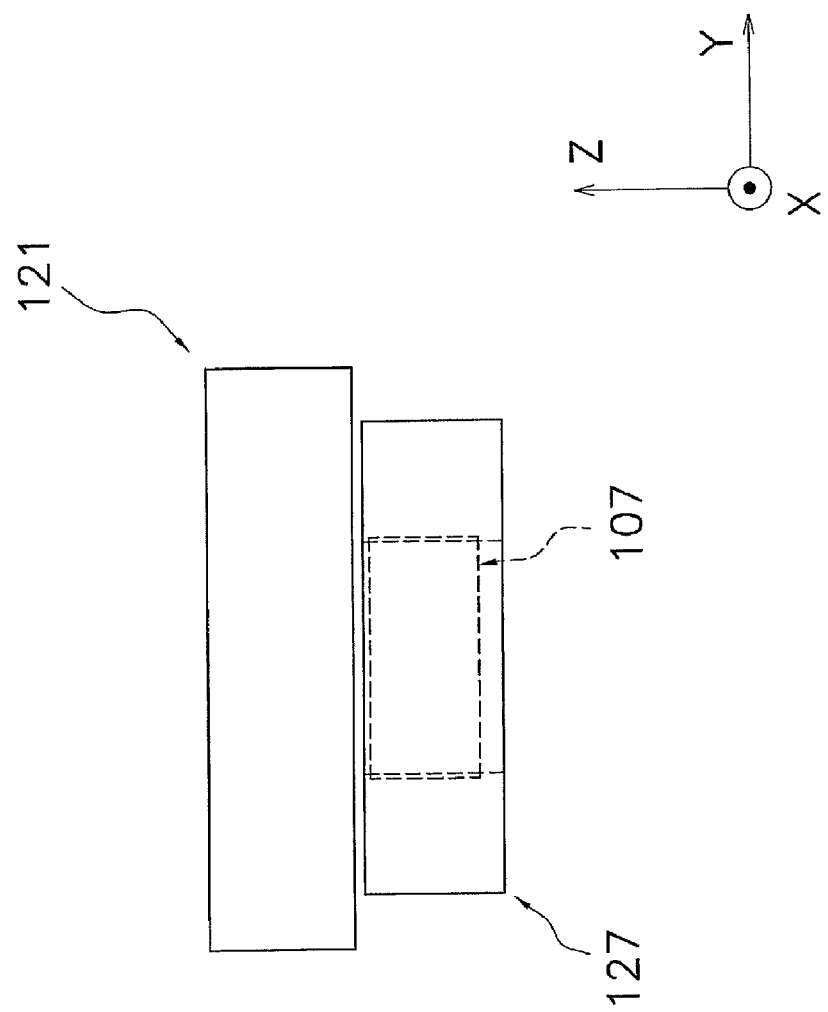
FIG. 10 is a simplified cross section along the X-X line in FIG. 7 in according with the first embodiment.

As shown in FIG. 7, the pitch hall sensor 107 is substantially arranged in the same position as the second coil 127 along the Z-axis direction. As shown in FIGS. 7 and 10, with respect to the second optical axis A2, the pitch hall sensor 107 is positioned on the outer side of the second coil 127, along the longitudinal direction of the correcting lens 101.

The positional relation between the pitch hall sensor 107 and the second coil 127 when viewed in the X-axis direction is not limited to that shown in FIG. 10. For example, when viewed in the X-axis direction, at least part of the pitch hall sensor 107 may overlap the second coil 127.

6: Operation of Lens Drive Device

The lens drive device 100 described above is controlled, for example, by the controller 9 according to the output from a blur detection sensor. In other words, when a blur detection sensor detects the amount of shake of the camera body 2 around the X and Z axes, the controller 9 calculates the target position of the moving frame 119 with respect to the base frame 102. Also, the current positions of the moving frame 119 in the yaw and pitch directions are detected by the yaw hall sensor 106 and the pitch hall sensor 107. The controller 9 calculates the drive direction and drive amount of the moving frame 119 on the basis of the target position and the current position. The controller 9 controls the first coil 126 and the second coil 127 so that current corresponding to the drive direction and drive amount is sent to the first coil 126 and the second coil 127.

As shown in FIG. 8, when current of a specific direction is sent to the first coil 126, an electromagnetic force F11 is generated, for example, and the moving frame 119 and the correcting lens L7 move to the X-axis direction positive side with respect to the base frame 102. When current of the opposite direction is sent to the first coil 126, as shown in FIG. 8, an electromagnetic force F12 is generated, and the moving frame 119 and the correcting lens L7 move to the X-axis direction negative side with respect to the base frame 102.

Meanwhile, when current of a specific direction is sent to the second coil 127, an electromagnetic force F21 is generated, for example, and the correcting lens L7 moves to the Y-axis direction positive side. When current of the opposite direction is sent to the second coil 127, as shown in FIG. 8, an electromagnetic force F22 is generated, and the moving frame 119 and the correcting lens L7 move to the Y-axis direction negative side with respect to the base frame 102.

As described above, with this lens drive device 100, the correcting lens L7 can be driven in a direction perpendicular to the second optical axis A2 according to the amount of shake of the camera body 2, so displacement of the optical image with respect to the imaging element 11 caused by shaking of the camera body 2 can be reduced.

7: Features of Layout

The features of the layout of the lens drive device 100 will now be described through reference to FIG. 8.

As shown in FIG. 8, with the lens drive device 100, the correcting lens L7, the rotating shaft 115, the center of gravity G, the yaw actuator 104, and the pitch actuator 103 are substantially aligned in the X-axis direction (yaw direction). In this embodiment, the correcting lens L7 is positioned between the yaw actuator 104 and the pitch actuator 103. Also, in this embodiment, the yaw actuator 104 (the first coil 126 and the yaw hall sensor 106) is disposed between the correcting lens L7 and the rotating shaft 115. The yaw actuator 104 can also be positioned on the same side of the correcting lens L7 as the rotating shaft 115 in the X-axis direction.

The layout of the various members will now be described in further detail. As shown in FIG. 8, the correcting lens L7, the rotating shaft 115, the first coil 126, the yaw hall sensor 106, the second coil 127, and the pitch hall sensor 107 are substantially aligned in the X-axis direction. When the moving frame 119 is at the reference position, the third optical axis A3 of the correcting lens L7, the center C2 of the second coil 127, the center D1 of the yaw hall sensor 106, and the center D2 of the pitch hall sensor 107 are substantially aligned linearly in the X-axis direction. If we term a line that is perpendicular to the center axis M and the third optical axis A3 as a reference line H, then when the moving frame 119 is at the reference position, the third optical axis A3 of the correcting lens L7, the center axis M of the rotating shaft 115, the center C1 of the first coil 126, the center C2 of the second coil 127, the center D1 of the yaw hall sensor 106, and the center D2 of the pitch hall sensor 107 are disposed substantially on the reference line H.

The positional relationship between the correcting lens L7, the yaw actuator 104, and the yaw hall sensor 106 will now be described. As shown in FIG. 8, when the moving frame 119 is at the reference position, the correcting lens L7, the first coil 126, and the yaw hall sensor 106 are disposed aligned in the X-axis direction. In this embodiment, the first coil 126 is between the correcting lens L7 and the yaw hall sensor 106. In other words, the yaw hall sensor 106 is on the opposite side of the first coil 126 from the correcting lens L7.

Also, as shown in FIG. 8, the yaw hall sensor 106 is at a position that is closer to the rotating shaft 115 than the first coil 126. The yaw hall sensor 106 is arranged between the rotating shaft 115 and the first coil 126. Meanwhile, the pitch hall sensor 107 is positioned closer to the rotating shaft 115 than the second coil 127 and arranged between the correcting lens L7 and the second coil 127.

Furthermore, as shown in FIG. 8, when the moving frame 119 is at the reference position, the yaw hall sensor 106 overlaps the reference line H that passes through the center C1 of the first coil 126 and the third optical axis A3. In the alternative, the first coil 126 overlaps the reference line H that passes through the center D1 of the yaw hall sensor 106 and the third optical axis A3. Also, as mentioned above, when the moving frame 119 is at the reference position, the 1 of the first coil 126 and the center D1 of the yaw hall sensor 106 are positioned near or on the reference line H.

As shown in FIG. 8, the first coil 126 and the yaw hall sensor 106 overlap the reference line H that passes through the center axis M of the rotating shaft 115 and the third optical axis A3. More precisely, the center C1 of the first coil 126 and the center D1 of the yaw hall sensor 106 are near or on the reference line H.

Here, the center C1 of the first coil 126 refers to the center of the first coil 126 when viewed in the Z-axis direction. The intersection between the center line in the Y-axis direction and the center line in the X-axis direction found from the external shape of the first coil 126 becomes the center C1. That is, if the planar shape of the coil is substantially quadrangular, the center of the quadrangle becomes the center of the coil. Similarly, with the second coil 127, the center C2 of the second coil 127 refers to the center of the second coil 127 when viewed in the Z-axis direction, and the intersection between the center line in the Y-axis direction and the center line in the X-axis direction found from the external shape of the second coil 127 becomes the center C2. With a shape such as that of the first coil 126 and the second coil 127, the centers C1 and C2 can be viewed as the drive centers of the yaw actuator 104 and the pitch actuator 103. In other words, the point at which drive force acts on the correcting lens frame 101 can be viewed as substantially coinciding with the centers C1 and C2 when viewed in the Z-axis direction.

The center D1 of the yaw hall sensor 106 refers to the center of the yaw hall sensor 106 when viewed in the Z-axis direction, and the intersection between the center line in the Y-axis direction and the center line in the X-axis direction found from the external shape of the yaw hall sensor 106 becomes the center D1. The center D2 of the pitch hall sensor 107 refers to the center of the pitch hall sensor 107, and the intersection between the center line in the Y-axis direction and the center line in the X-axis direction found from the external shape of the pitch hall sensor 107 becomes the center D2.

8: Features of Lens Drive Device (1) As shown in FIG. 8, with the lens drive device 100, since the correcting lens L7, the yaw actuator 104, and the pitch actuator 103 are substantially aligned in the X-axis direction (yaw direction), the device is slender in the X-axis direction (yaw direction) and is more compact in the Y-axis direction (pitch direction). Furthermore, since the yaw hall sensor 106 is aligned with the first coil 126 in the X-axis direction when viewed in the Z-axis direction, the yaw actuator 104 that drives the correcting lens frame 101 in the X-axis direction (yaw direction) can be made smaller in the Y-axis direction (pitch direction). This constitution makes it possible to reduce the overall size of the lens drive device 100.

(2) As shown in FIG. 8, the yaw hall sensor 106 is on the opposite side of the first coil 126 from the correcting lens L7. In other words, the yaw hall sensor 106 is arranged between the first coil 126 and the rotating shaft 115. As a result, it is easier to position the first coil 126 closer to the correcting lens L7, i.e. it is easier to position the first coil 126 near the center of gravity G. Consequently, the size of the device in the Y-axis direction can be reduced while stabilizing the drive of the moving frame 119 in the X-axis direction.

As shown in FIG. 8, the third optical axis A3 of the correcting lens L7, the center C1 of the first coil 126, and the center D1 of the yaw hall sensor 106 are preferably aligned linearly along the X-axis direction. More specifically, when viewed in the Z-axis direction, the yaw hall sensor 106 preferably overlaps the reference line H that passes through the center C1 of the first coil 126 and the third optical axis A3 of the correcting lens L7. Further, when viewed in the Z-axis direction, the third optical axis A3 of the correcting lens L7, the center C1 of the first coil 126, and the center D1 of the yaw hall sensor 106 are preferably arranged near or on the reference line H. This layout allows the moving frame 119 to be driven more precisely and efficiently along the X-axis direction.

(3) When the moving frame 119 rotates about the Z-axis direction (or around the rotating shaft 115) towards the Y-axis direction relative to the base frame 102, the yaw hall sensor 106 is caused to move in the X-axis direction relative to the first magnet 120. If the yaw hall sensor 106 moves in the X-axis direction relative to the first magnet 120, there is the risk that the detection accuracy of the yaw hall sensor 106 will decrease.

With the lens drive device 100, however, since the yaw actuator 104 is on the same side of the correcting lens L7 as the rotating shaft 115 in the X-axis direction, the distance from the rotating shaft 115 to the yaw hall sensor 106 is shortened. Accordingly, when the moving frame 119 rotates about the Z-axis direction (or around the rotating shaft 115) towards the Y-axis direction, the distance that the yaw hall sensor 106 moves in the X-axis direction relative to the first magnet 120 is also shortened. As a result, rotation of the moving frame 119 has little effect on the detection accuracy of the yaw hall sensor 106.

Moreover, as shown in FIG. 8, the yaw hall sensor 106 is disposed between the first coil 126 and the rotating shaft 115. In this arrangement, the yaw hall sensor 106 is positioned closer to the rotating shaft 115 than the first coil 126. This allows for a shorter distance from the rotating shaft 115 to the yaw hall sensor 106 and further reduces the effect that rotation of the moving frame 119 has on the detection accuracy of the yaw hall sensor 106. Also, since this layout allows the first coil 126 to be closer to the center of gravity G of the entire moving portion, driving the moving frame 119 in the X-axis direction tends to be more stable.

As shown in FIG. 8, it is preferable that the center axis M of the rotating shaft 115, the center C1 of the first coil 126, and the center D1 of the yaw hall sensor 106 are linearly aligned in the X-axis direction. Because of this arrangement, the amount of movement of the yaw hall sensor 106 in the X-axis direction caused by rotating the moving frame 119 can be kept to a minimum. This effectively reduces the effect that rotation of the moving frame 119 has on the detection accuracy of the yaw hall sensor 106.

(4) Also, as shown in FIG. 8, since the second coil 127 is positioned on the same side of the correcting lens L7 as the pitch hall sensor 107, the distance from the rotating shaft 115 to the second coil 127 is greater than the distance from the rotating shaft 115 to the yaw actuator 104. Thus, the ratio of the distance from the rotating shaft 115 to the second coil 127 versus the distance from the rotating shaft 115 to the center of gravity G of the entire moving portion is higher, the rotational moment generated by the drive force of the pitch actuator 103 can be raised, and the pitch actuator 103 can be made more compact.

(5) As shown in FIG. 8, since the center of gravity G of the entire moving portion and the center C1 of the first coil 126 are aligned in the X-axis direction, when the moving frame 119 is driven in the X-axis direction, less rotational moment is generated around the center of gravity G as a result of the drive force of the yaw actuator 104. As a result, the moving frame 119 can be driven more accurately and efficiently. Also, since there is less rotational moment generated around the center of gravity G, the sliding load generated between the rotating shaft 115 and the guide portion 131 can be reduced. This allows the moving frame 119 to be driven even more accurately and efficiently.

As shown in FIG. 8, the center of gravity G of the entire moving portion, the center C1 of the first coil 126 and the center axis M of the rotating shaft 115 are preferably arranged near or on the reference line H. This arrangement allows the moving frame 119 to be driven even more accurately and efficiently.

(6) As shown in FIG. 8, when viewed in the Z-axis direction, the yaw hall sensor 106 and the pitch hall sensor 107 overlap the reference line H that passes through the third optical axis A3 of the correcting lens L7 and the center axis M of the rotating shaft 115. Accordingly, the amount of movement of the yaw hall sensor 106 and the pitch hall sensor 107 in the yaw direction (or X-axis direction), which occurs when the moving frame 119 rotates from its reference position about the Z-axis direction towards the pitch direction (Y-axis direction), can be kept to a minimum. Furthermore, since the amount of movement of the yaw hall sensor 106 and the pitch hall sensor 107 in the yaw direction is substantially symmetrical on the positive and negative sides in the pitch direction (Y-axis direction) relative to the reference line H, rotation of the moving frame 119 will have little effect on the detection accuracy of the yaw hall sensor 106 and the pitch hall sensor 107.

(7) As shown in FIG. 8, since the center C1 of the first coil 126 is arranged near or on the reference line H that passes through the third optical axis A3 of the correcting lens L7 and the center axis M of the rotating shaft 115, the amount of movement of the first coil 126 in the yaw direction, which occurs when the moving frame 119 moves from its reference position in the pitch direction, can be kept to a minimum. As a result, the correcting lens L7 can be driven more accurately and more efficiently.

(8) As shown in FIGS. 7 and 8, the first magnet 120 of the lens drive device 100 is magnetized with three poles, and the yaw hall sensor 106 is arranged opposite to the second polarization line 129. In FIG. 8, the second polarization line 129 is shown disposed between the second portion 120b of the S pole and the third portion 120c of the N pole. As a result, the magnetic flux density of the first magnet 120 varies at a constant rate around the second polarization line 129. Since the region in which the magnetic flux density varies at a constant rate can be used for position detection, it is possible to improve the detection accuracy of the yaw hall sensor 106. Therefore, the size of the drive device in the Y-axis direction can be reduced and the detection accuracy of the yaw hall sensor 106 increased.

Second Embodiment

Figure 11:
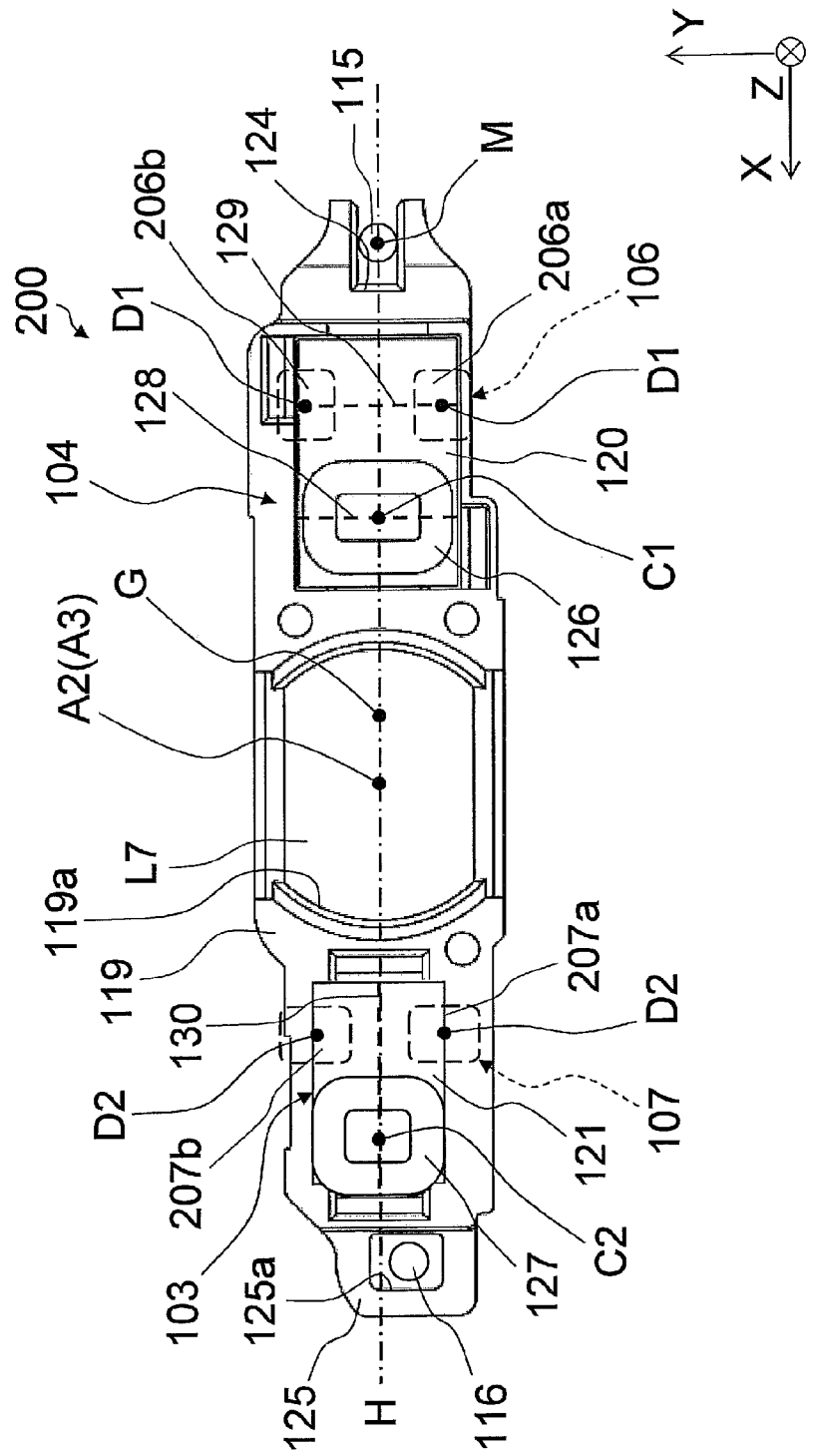
FIG. 11 is a schematic plan view of a lens drive device in according with a second embodiment.

Referring now to FIG. 11, a lens drive device 200 (an example of an optical element driving device) in accordance with a second embodiment will now be explained. The components that have substantially the same function as those in the above embodiment will be numbered the same and will not be described again.

The positions of the yaw hall sensor 106 and the pitch hall sensor 107 are not limited to the arrangement shown in the first embodiment above. For instance, as shown in FIG. 8 of the first embodiment, the center axis M of the rotating shaft 115, the center C1 of the first coil 126 and the center D1 of the yaw hall sensor 106 can be aligned linearly along the X-axis direction. However, in this second embodiment, when viewed in the Z-axis direction, the yaw hall sensor 106 can be substantially aligned with the first coil 126 in the X-axis direction or offset from the reference line H in the Y-axis direction as indicated by the positions 206a and 206b. When the yaw hall sensor 106 is located at the positions 206a and 206b, the center D1 of the yaw hall sensor 106 is positioned substantially on the second polarization line 129. Although it is preferred that the center D1 of the yaw hall sensor 106 is positioned substantially on the second polarization line 129, the center D1 of the yaw hall sensor 106 can be offset from the second polarization line 129.

Also, as shown in FIG. 8 of the first embodiment, the center axis M of the rotating shaft 115, the center C2 of the second coil 127, and the center D2 of the pitch hall sensor 107 can be disposed linearly in the X-axis direction. However, in this second embodiment, when viewed in the Z-axis direction, the pitch hall sensor 107 can be substantially aligned in the X-axis direction with the second coil 127 or offset from the reference line H in the Y-axis direction as indicated by the positions 207a and 207b. When the pitch hall sensor 107 is located at the positions 207a and 207b, the center D2 of the pitch hall sensor 107 is positioned substantially on the edge of the second magnet 121. Although it is preferred that the center D2 of the pitch hall sensor 107 is positioned substantially on the edge of the second magnet 121, the center D2 of the pitch hall sensor 107 can be offset from the edge of the second magnet 121.

Third Embodiment

Figure 12:
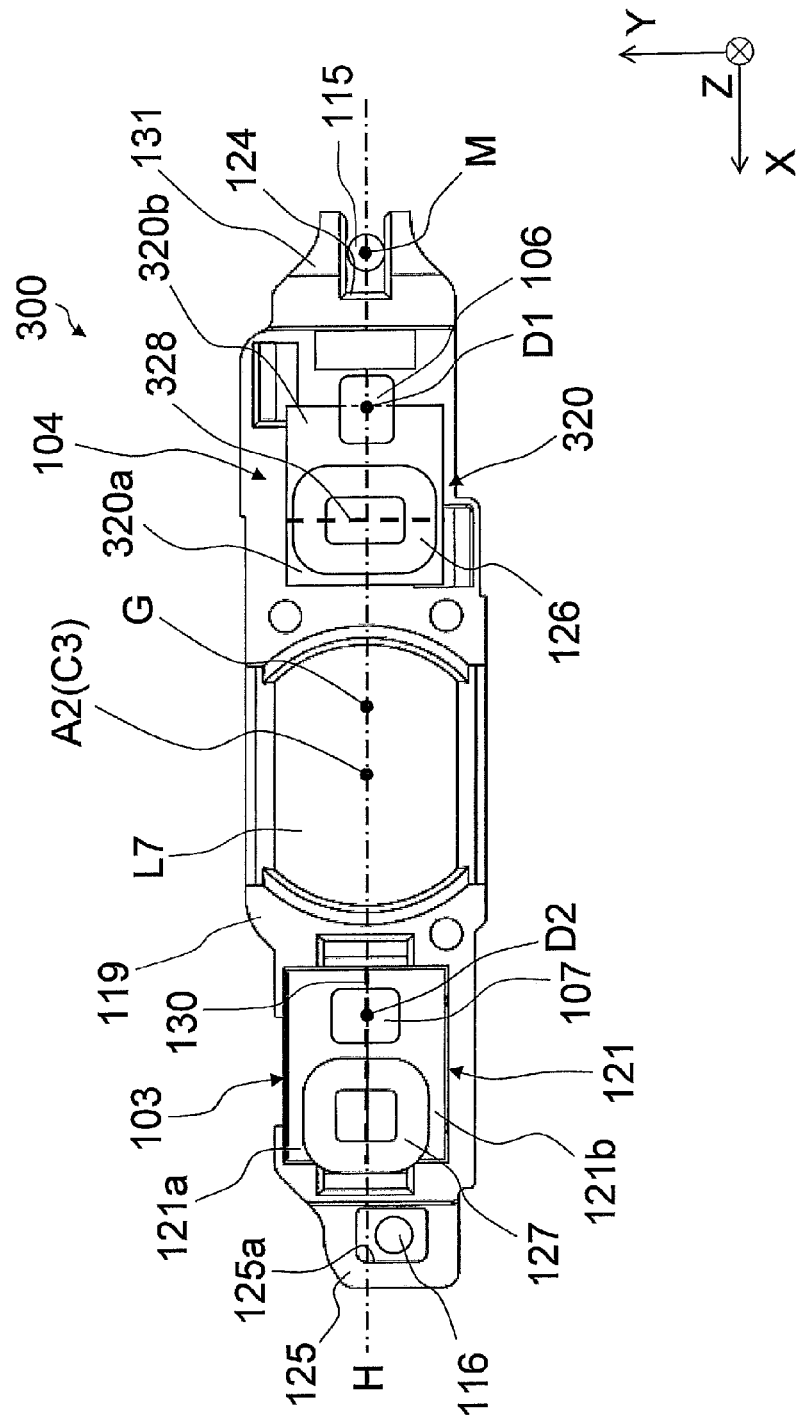
FIG. 12 is a schematic plan view of a lens drive device in according with a third embodiment.

Referring now to FIG. 12, a lens drive device 300 (an example of an optical element driving device) in accordance with a third embodiment will now be explained. The components that have substantially the same function as those in the above embodiments will be numbered the same and will not be described again.

If the detection accuracy of the yaw hall sensor is good, then a first magnet 320, as shown in FIG. 12, can be magnetized with just two poles. In other words, it is not necessary that the first magnet be magnetized with three poles. In this case, the first magnet 320 includes a first portion 320a magnetized with the N-pole (an example of a first magnetic pole), a second portion 320b magnetized with the S-pole (an example of a second magnetic pole) and a first polarization line 328, but the first magnet 320 does not have components corresponding to the third portion 120c and second polarization line 129.

As shown in FIG. 12, the size of the first magnet 320 can be smaller than the above-mentioned first magnet 120. The first portion 320a corresponds to the above-mentioned first portion 120a, and the second portion 320b corresponds to the second portion 120b. As shown in FIG. 12, the center D1 of the yaw hall sensor 106 can be arranged opposite to the edge of the first magnet 120 in the Z-axis direction. The center D1 of the yaw hall sensor 106 can also be offset from the edge of the first magnet 120. For example, when viewed in the Z-axis direction, the center D1 of the yaw hall sensor 106 can be positioned inside the area defined by the edge of the second portion 320b. With these arrangements, the yaw hall sensor 106 can perform position detection by utilizing the magnetic field formed by the second portion 320b. Note that the size of the second portion 320b is not limited to the size shown in FIG. 12 but can be smaller or larger than the size shown in FIG. 12

Fourth Embodiment

Figure 13:
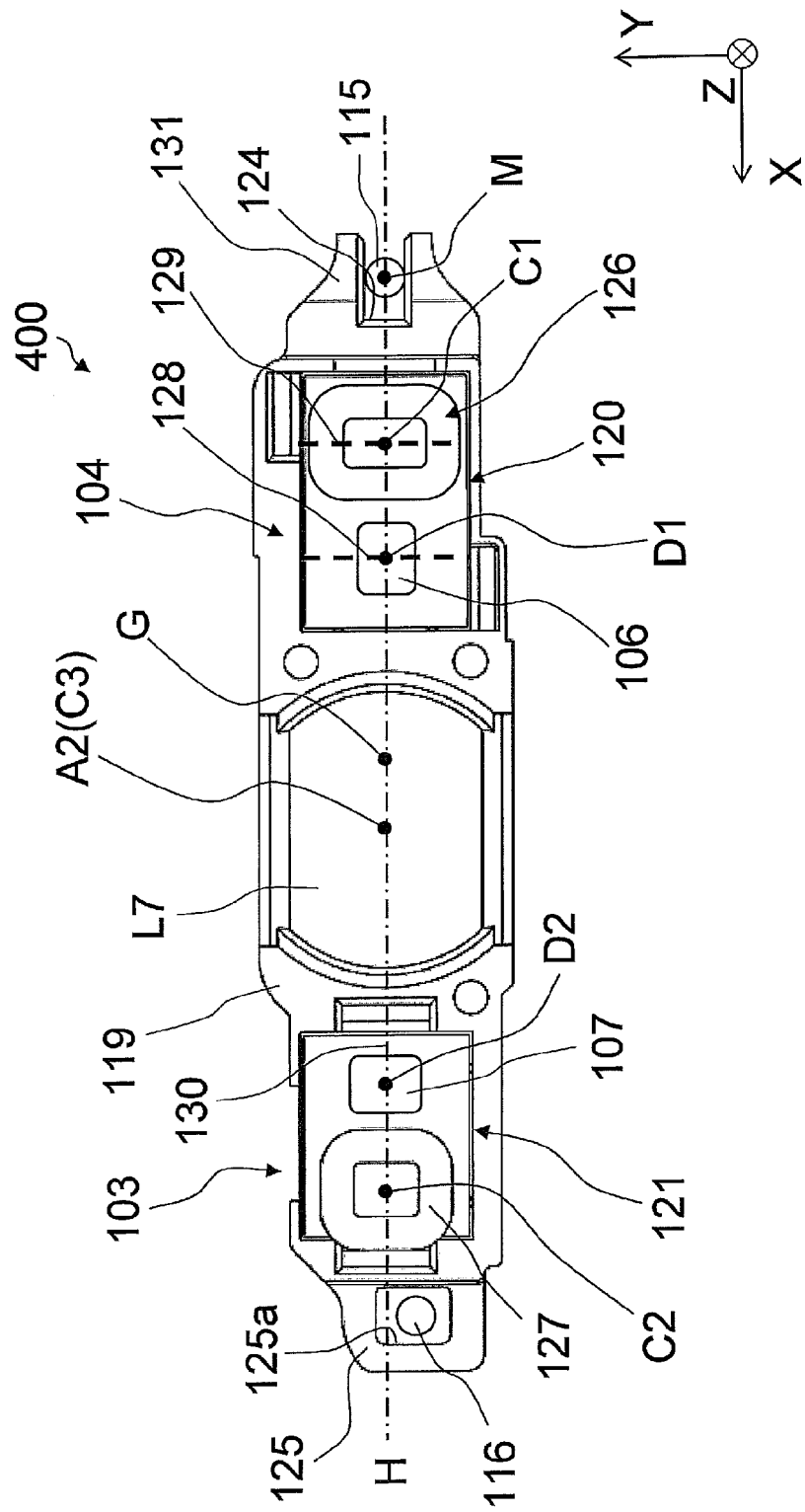
FIG. 13 is a schematic plan view of a lens drive device in according with a fourth embodiment.
Figure 14:
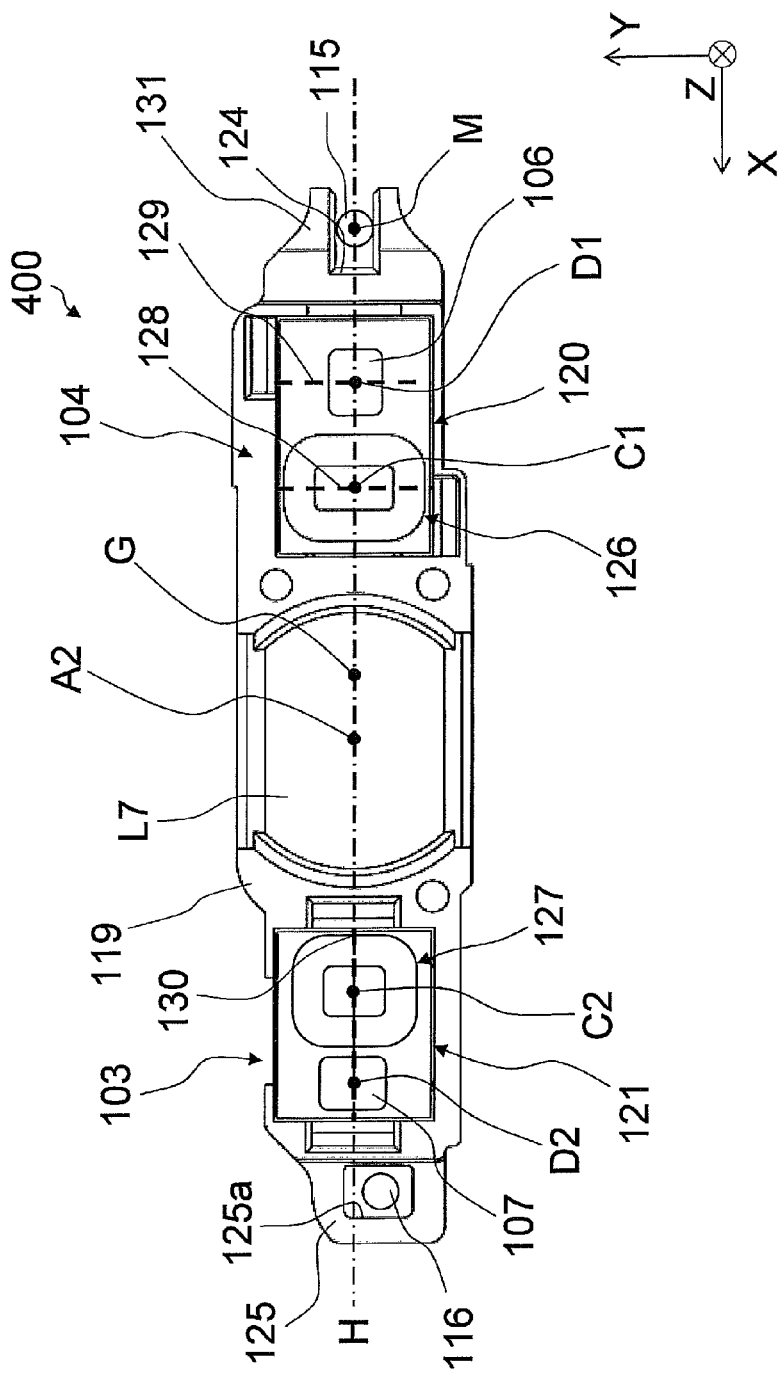
FIG. 14 is a schematic plan view of a lens drive device in according with the fourth embodiment.
Figure 15:
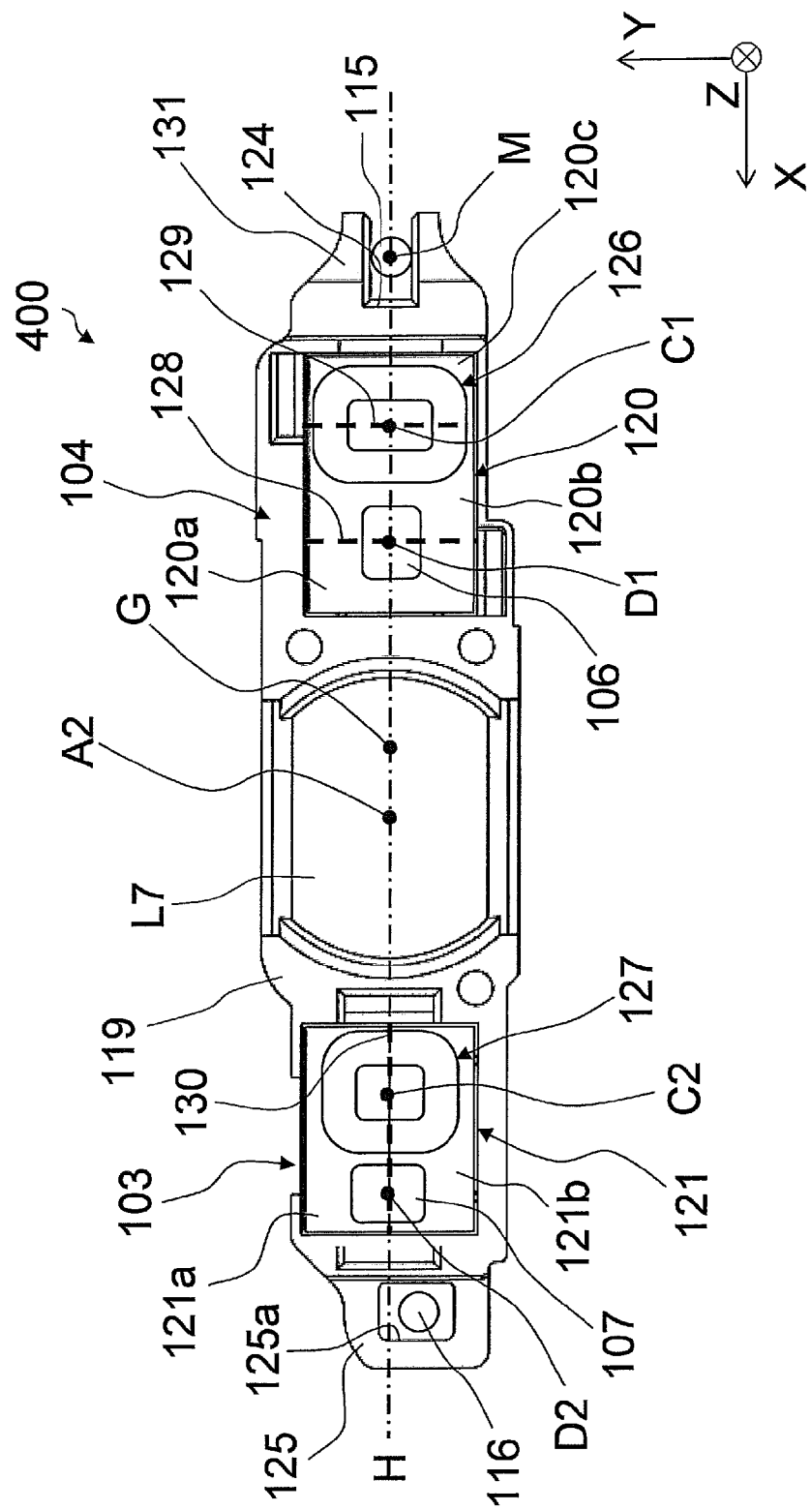
FIG. 15 is a schematic plan view of a lens drive device in according with the fourth embodiment.

Referring now to FIGS. 13 to 15, a lens drive device 400 (an example of an optical element driving device) in accordance with a fourth embodiment will now be explained. The components that have substantially the same function as those in the above embodiments will be numbered the same and will not be described again.

The positional relationship between the yaw hall sensor 106 and the first coil 126 and the pitch hall sensor 107 and the second coil 127 are not limited to that in the above embodiments. For instance, as shown in FIG. 13, the yaw hall sensor 106 can be disposed between the first coil 126 and the correcting lens L7, and as shown in FIG. 14, the second coil 127 can be disposed between the pitch hall sensor 107 and the correcting lens L7.

Furthermore, the arrangement shown in FIGS. 13 and 14 can be modified and combined to obtain the arrangement shown in FIG. 15 employed. In other words, the yaw hall sensor 106 can be disposed between the first coil 126 and the correcting lens L7 and the second coil 127 disposed between the pitch hall sensor 107 and the correcting lens L7.

Fifth Embodiment

Figure 16:
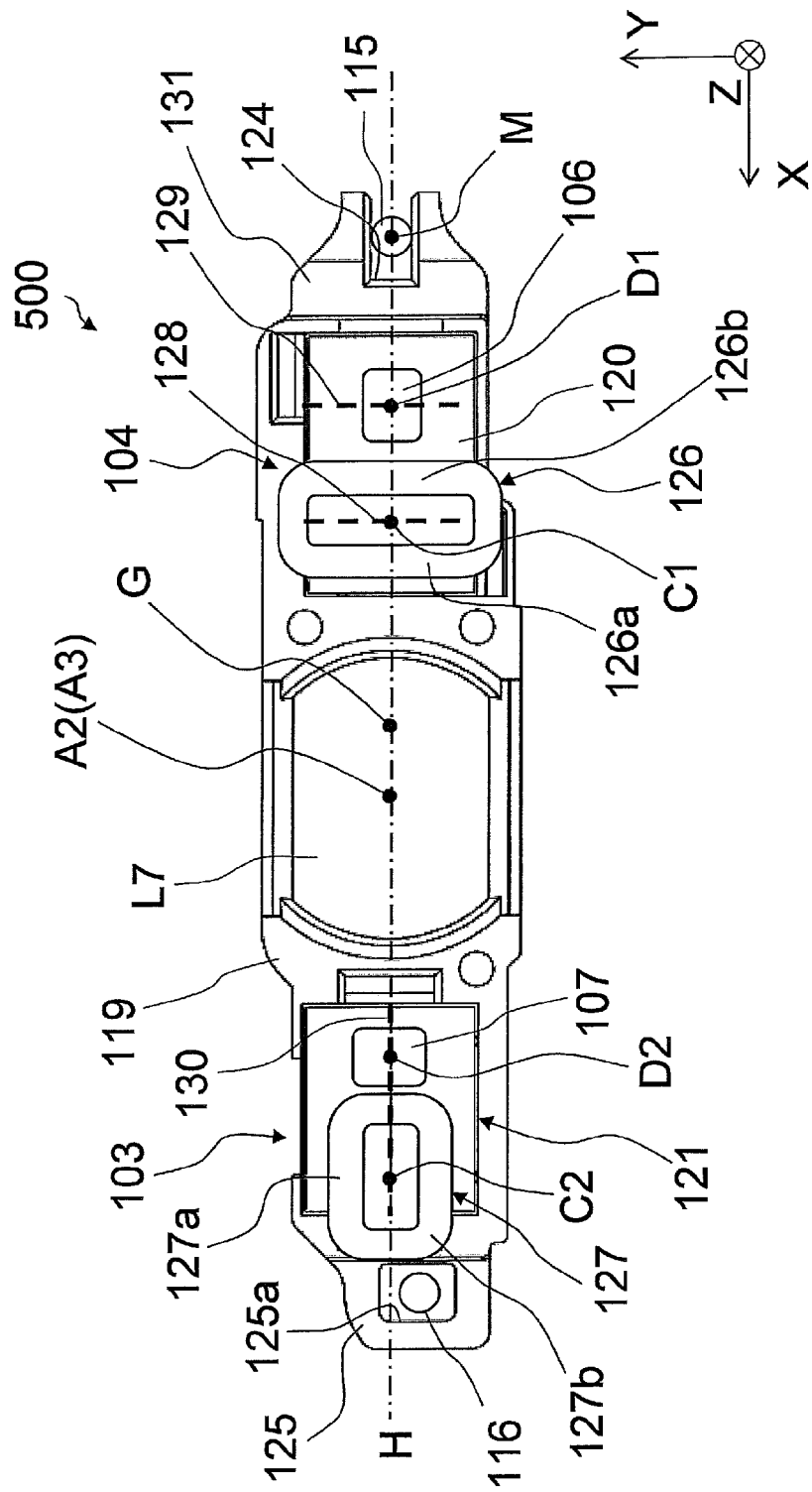
FIG. 16 is a schematic plan view of a lens drive device in according with a fifth embodiment.

Referring now to FIG. 16, a lens drive device 500 (an example of an optical element driving device) according to a fifth embodiment will be described. The components that have substantially the same function as those in the above embodiment will be numbered the same and will not be described again.

The amount of drive force generated by the yaw actuator 104 is determined by the amount of current sent to the first coil 126 and the length of the drive force generators 126a and 126b in the Y-axis direction. In other words, if the drive force generators 126a and 126b are lengthened in the Y-axis direction, a greater drive force can be obtained. For example, when the moving frame 119 is at the reference position, as illustrated in FIG. 16, the length of the drive force generators 126a and 126b in the Y-axis direction are shown extending up to the edge of the first magnet 120. With this configuration, the entire length of the drive force generators 126a and 126b in the Y-axis direction overlaps the first magnet 120, and as a result, allows the yaw actuator 104 to generate a greater driving force at any given current value.

Similarly, the amount of drive force generated by the pitch actuator 103 is determined by the amount of current sent to the second coil 127 and the length of drive force generators 127a and 127b in the X-axis direction. In other words, if the drive force generators 127a and 127b are lengthened in the X-axis direction, a greater drive force can be obtained. For example, when the moving frame 119 is at the reference position, as illustrated in FIG. 16, the length of the drive force generators 127a and 127b in the X-axis direction are shown extending up to the edge of the first magnet 121. With this arrangement, the entire length of the drive force generators 127a and 127b in the X-axis direction overlaps the second magnet 121, and as a result, allows the pitch actuator 103 to generate a greater driving force at any given current value.

It is preferred here that the moving frame 119 does not interfere with other members when it moves in the pitch and yaw directions, but no such restrictions apply to the base frame 102. That is, the external dimensions of the lens drive device 100 in the pitch and yaw directions are determined by whichever is larger among the base frame 102 and the movement range of the moving frame 119. In other words, in both the pitch direction and the yaw direction, making the external dimensions of the base frame 102 larger than the external dimensions of the moving frame 119 has little effect on the external dimensions of the lens drive device 100.

Therefore, when the first coil 126 or the second coil 127 is fixed to the base frame 102, as shown in FIG. 16, if the external dimensions of the first coil 126 and the second coil 127 are increased within a range that falls within the external dimensions of the base frame 102, the device can be made more compact while improving the actuator performance.

Sixth Embodiment

Figure 17:
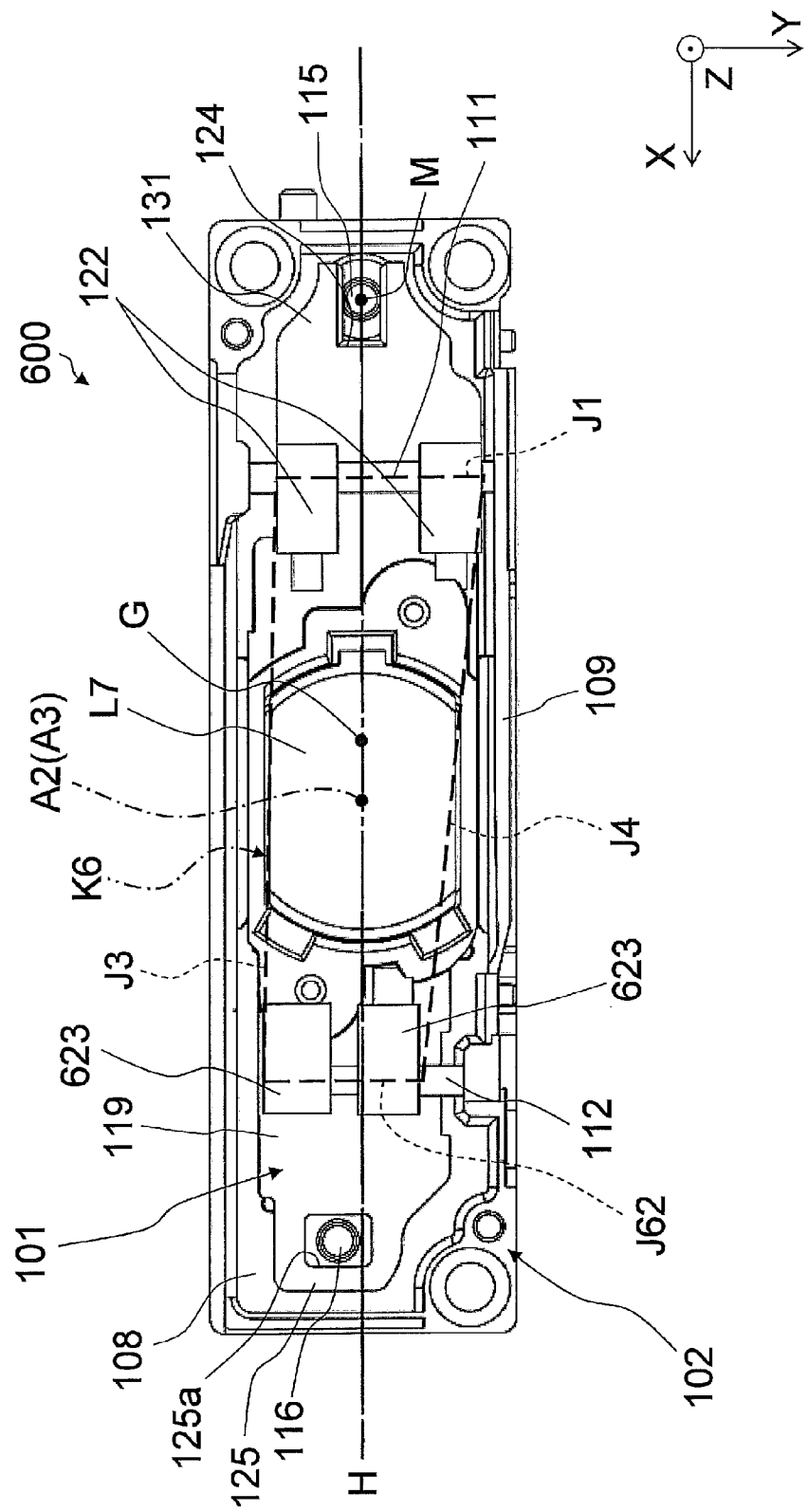
FIG. 17 is a top view of a lens drive device in according with a sixth embodiment.

Referring now to FIG. 17, a lens drive device 600 (an example of an optical element driving device) in accordance with a sixth embodiment will now be explained. The components that have substantially the same function as those in the above embodiment will be numbered the same and will not be described again.

In the above embodiments, the second sliding portion 123 was a single portion, but just as with the first sliding portions 122, the second sliding portion 123 can be divided into two portions. For instance, as shown in FIG. 17, the lens drive device 600 includes a pair of second sliding portions 623 mounted on the upper face of the moving frame 119. More specifically, unlike the configuration shown in FIG. 6, where the support range or the point of contact between the second guide shaft 112 and the pair of second gliding portions 123 is indicated by the line J2, the support range or the point of contact between the second guide shaft 112 and the pair of second gliding portions 623 in FIG. 17 is indicated by line J62 which is longer than the line J2. As illustrated by FIG. 17, the center of gravity G is located within a region K6 formed by the lines J1, J62, J3, and J4. Compared to the above-mentioned region K1 in FIG. 6, the region K6 is larger by an amount corresponding to the greater length of the line J62. Accordingly, compared to the constitution shown in FIG. 6, the arrangement shown in FIG. 17 effectively reduces rotation of the moving frame 119 around the X-axis with respect to the base frame 102. As a result, the moving frame 119 is more stable when driven.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of an imaging device equipped with the optical element driving. Accordingly, these terms, as utilized to describe the present invention should be interpreted relative to an imaging device equipped with the optical element driving device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

What is claimed is:

1. An optical element driving device comprising:
   at least one optical element having an optical axis;
   a moving member configured to move and support the optical element;
   a fixed member movably supporting the moving member in a direction perpendicular to the optical axis;
   a first actuator including a first coil coupled to one of the moving member and the fixed member and a first magnet disposed opposite to the first coil and coupled to a different one of the moving member and the fixed member, the first magnet including a first portion having a first magnetic pole, a second portion having a second magnetic pole different from the first magnetic pole and a third portion having the first magnetic pole,
   the first, the second and the third portions extending in a first direction with the first and second portions being separated by a first polarization line substantially parallel to a second direction and substantially perpendicular to the first direction, the second and third portions being separated by a second polarization line substantially parallel to the first polarization line, the first actuator being configured to drive the moving member in the first direction;
   a first detection element coupled to one of the moving member and the fixed member together with the first coil to detect the position of the moving member in the first direction relative to the fixed member, the first coil being disposed opposite to the first polarization line, and the first detection element being disposed opposite to the second polarization line;
   a second actuator including a second coil coupled to one of the moving member and the fixed member and a second magnet disposed opposite to the second coil and coupled to a different one of the moving member and the fixed member, the second actuator being configured to drive the moving member in the second direction substantially perpendicular to the first direction; and
   a second detection element coupled to one of the moving member and the fixed member together with the second coil to detect the position of the moving member in the second direction relative to the fixed member,
   the first actuator being substantially aligned in the first direction with the optical element when viewed in a third direction parallel to the optical axis,
   the first detection element being substantially aligned in the first direction with the first coil when viewed in the third direction, and
   the second detection element and the second coil being substantially aligned in the first direction with the first actuator when viewed in the third direction.

2. The optical element driving device according to claim 1, wherein
   at least part of the first detection element overlaps the first coil when viewed from the first direction.

3. The optical element driving device according to claim 1, wherein
   the first detection element overlaps a line passing through the center of the first coil and the optical axis when viewed from the third direction.

4. The optical element driving device according to claim 1, wherein
   the first detection element is on the opposite side of the first coil from the optical element when viewed from the third direction.

5. The optical element driving device according to claim 1, wherein
   the first coil is disposed between the optical element and the first detection element when viewed from the third direction.

6. The optical element driving device according to claim 1, wherein
   the optical element is disposed between the first actuator and the second actuator when viewed from the third direction.

7. The optical element driving device according to claim 1, further comprising:
   a rotating shaft extending in the third direction and coupled to one member selected from among the fixed member and the moving member; and
   a guide portion including a rotary guide groove to receive the rotating shaft, the guide portion being joined to a different member selected from among the fixed member and the moving member.

8. The optical element driving device according to claim 7, wherein
   the rotating shaft is on the outside of the optical element when viewed from the third direction.

9. The optical element driving device according to claim 8, wherein
   the rotating shaft, the optical element, the first actuator and the second actuator are substantially aligned along the first direction.

10. The optical element driving device according to claim 8, wherein
    the first actuator is on the same side of the optical element as the rotating shaft and extends along the first direction.

11. The optical element driving device according to claim 8, wherein
    the first detection element is arranged closer to the rotating shaft than the first coil.

12. The optical element driving device according to claim 8, wherein
    the first detection element is disposed between the rotating shaft and the first coil.

13. The optical element driving device according to claim 12, wherein
    the first detection element overlaps a first reference line that links the optical axis and the center of the rotating shaft when viewed in the third direction.

14. The optical element driving device according to claim 8, wherein
    the center of the rotating shaft, the center of the first coil, and the center of the first detection element are linearly aligned in the first direction.

15. The optical element driving device according to claim 8, wherein
    the second detection element is arranged closer to the rotating shaft than the second coil.

16. The optical element driving device according to claim 1, wherein
    the optical axis of the optical element, the center of the first coil, and the center of the first detection element are linearly aligned in the first direction.

17. The optical element driving device according to claim 1, further comprising:
    a guide mechanism configured to guide the moving member in a direction perpendicular to the optical axis and including a first guide member and a second guide member fixed to the fixed member, a first sliding portion mounted on the moving member and arranged to matingly receive the first guide member and a second sliding portion mounted on the moving member and arranged to matingly receive the second guide member, the point of contact between the first sliding portion and the first guide member along the second direction is larger than the point of contact between the second sliding portion and the second guide member in the same direction.

18. The optical element driving device according to claim 17, wherein
the first magnet is larger than the second magnet, and at least part of the first sliding portion overlaps the first magnet and at least part of the second sliding portion overlaps the second magnet when viewed from the third direction.

19. The optical element driving device according to claim 18, wherein
the first magnet and the second magnet are coupled to the moving member.

20. An imaging device comprising:
an imaging optical system including a correcting lens configured to form an optical image of a subject;
an imaging element configured to convert an optical image of the subject into an image signal; and
the optical element driving device according to claim 19 to drive one of the correcting lens and the imaging element as the optical element.

21. The imaging device according to claim 20, wherein
the imaging optical system further includes a first optical system having a first optical axis and a second optical axis that intersects the first optical axis and configured and arranged to reflect light that is incident along the first optical axis in a direction parallel to the second optical axis and a second optical system having the correcting lens and configured and arranged to guide light emitted from the first optical system along the second optical axis to the imaging element.

22. The imaging device according to claim 21, wherein
the first direction is perpendicular to a plane that includes the first optical axis and the second optical axis, and the second direction is parallel to the first optical axis, and the third direction is parallel to the second optical axis.

23. The optical element driving device according to claim 1, further comprising:
a rotating shaft extending in the third direction and coupled to one member selected from among the fixed members and the moving member, wherein the first actuator is closer to the rotating shaft than the second actuator.

24. The optical element driving device according to claim 1, further comprising:
a rotating shaft extending in the third direction and coupled to one member selected from among the fixed members and the moving member, wherein
the first detection element is disposed between the first actuator and the rotating shaft.

\* \* \* \* \*